United States Patent
Miyake

(10) Patent No.: US 9,676,951 B2
(45) Date of Patent: Jun. 13, 2017

(54) INK-JET INK SET

(71) Applicant: Seiko Epson Corporation, Tokyo (JP)

(72) Inventor: Yuho Miyake, Shiojiri (JP)

(73) Assignee: Seiko Epson Corporation (JP)

( * ) Notice: Subject to any disclaimer, the term of this patent is extended or adjusted under 35 U.S.C. 154(b) by 595 days.

(21) Appl. No.: 14/282,537

(22) Filed: May 20, 2014

(65) Prior Publication Data

US 2014/0345494 A1 Nov. 27, 2014

(30) Foreign Application Priority Data

May 24, 2013 (JP) .................. 2013-109645

(51) Int. Cl.
  *C09D 11/40* (2014.01)
  *C09D 11/324* (2014.01)
  *C09D 11/328* (2014.01)
  *C09B 5/14* (2006.01)
  *C09B 29/42* (2006.01)
  *C09B 43/16* (2006.01)
  *C09B 47/24* (2006.01)
  *C09B 47/26* (2006.01)
  *C08K 5/00* (2006.01)

(52) U.S. Cl.
  CPC ............ *C09D 11/328* (2013.01); *C09D 11/40* (2013.01); *C08K 5/0041* (2013.01); *C08K 2201/014* (2013.01)

(58) Field of Classification Search
  CPC ..... C09D 11/324; C09D 11/328; C09D 11/40; C09B 5/14; C09B 29/3652; C09B 43/16; C09B 47/24; C09B 47/26; B41J 2/01
  USPC ........... 106/31.27, 31.47, 31.48, 31.49, 31.5, 106/31.52, 31.6, 31.9
  See application file for complete search history.

(56) References Cited

U.S. PATENT DOCUMENTS

| 7,033,423 | B2* | 4/2006 | Rolly | C09D 11/40 106/31.27 |
|---|---|---|---|---|
| 7,393,094 | B2* | 7/2008 | Taguchi | C09D 11/328 106/31.27 |
| 7,566,362 | B2* | 7/2009 | Mori | C09D 11/328 106/31.47 |
| 7,615,112 | B2 | 11/2009 | Hayashida et al. | |
| 7,776,144 | B2* | 8/2010 | Taguchi | C09D 11/40 106/31.47 |
| 7,846,245 | B2* | 12/2010 | Parazak | C09D 11/40 106/31.27 |
| 7,866,808 | B2 | 1/2011 | Hayashida et al. | |
| 8,252,102 | B2* | 8/2012 | Taga | C09D 11/328 106/31.48 |
| 8,328,921 | B2* | 12/2012 | Ruud | C09D 11/328 106/31.27 |
| 8,602,544 | B2* | 12/2013 | Kawabe | C09D 11/328 347/100 |
| 8,603,232 | B2* | 12/2013 | Tsuzaka | C09D 11/324 106/31.47 |
| 2004/0035320 | A1* | 2/2004 | Sano | C09D 11/324 106/31.6 |
| 2006/0181587 | A1* | 8/2006 | Bauer | C09D 11/40 347/100 |
| 2007/0109377 | A1* | 5/2007 | Sano | C09D 11/40 347/100 |
| 2008/0145562 | A1* | 6/2008 | Kitamura | C09D 11/40 106/31.48 |
| 2010/0091079 | A1* | 4/2010 | Donovan | C09D 11/40 347/106 |
| 2010/0231663 | A1* | 9/2010 | Takasaki | C09B 5/14 106/31.48 |
| 2013/0011637 | A1* | 1/2013 | Morita | C09D 11/328 106/31.13 |
| 2013/0288019 | A1* | 10/2013 | Kawaguchi | C09D 11/328 106/31.48 |

FOREIGN PATENT DOCUMENTS

| JP | 2008-231165 A | 10/2008 |
|---|---|---|
| JP | 2008-297356 A | 12/2008 |
| JP | 2010-037504 A | 2/2010 |
| JP | 2010/037505 A * | 2/2010 |

OTHER PUBLICATIONS

English translation of JP 2010/037505, Feb. 2010; 90 pages.*

* cited by examiner

*Primary Examiner* — Helene Klemanski
(74) *Attorney, Agent, or Firm* — Harness, Dickey & Pierce, P.L.C.

(57) ABSTRACT

An ink-jet ink set includes a black ink containing carbon black; a cyan ink containing a first cyan dye; a magenta ink containing a first magenta dye; a yellow ink containing a first yellow dye; and a gray ink containing a second cyan dye, a second magenta dye, and a second yellow dye. The cyan ink, the magenta ink, the yellow ink, and the gray ink have a ROD of 65% or more, the ROD being defined by Equation (A). The gray ink has an OD value of 1.40 to less than 2.30, the OD value being defined by Equation (B).

11 Claims, No Drawings

INK-JET INK SET

BACKGROUND

1. Technical Field

The present invention relates to an ink-jet ink set.

2. Related Art

In ink-jet recording processes, achromatic images printed with a black ink only have a granular texture in some cases when the achromatic images are light in color. In order to prevent the occurrence of the granular texture, a black ink, a yellow ink, a magenta ink, and a cyan ink are used in combination to form an achromatic region as known. However, in the case of using dyes as colorants for these inks, there is a problem in that an achromatic image becomes colored due to fading.

In order to cope with the problem, JP-A-2008-297356 discloses an ink set for ink-jet recording. The ink set has an object to prevent an achromatic region from being colored even in the case where the achromatic region is exposed to air for a long period and therefore is faded by ozone in air. The ink set includes a dye yellow ink, a dye magenta ink, a dye cyan ink, and a dye black ink. In the case where a patch is formed using each ink and is subjected to a predetermined ozone resistance test and the rate of reduction in optical density (hereinafter referred to as "OD value") of the patch is investigated by the ozone resistance test, the order of magnitude of the rate of reduction in OD value of a yellow component, magenta component, and cyan component in the patch formed using the dye black ink is opposite to the order of magnitude of the rate of reduction in OD value of a yellow component in the patch formed using the dye yellow ink, a magenta component in the patch formed using the dye magenta ink, and a cyan component in the patch formed using the dye cyan ink.

However, in the case of recording a low-duty region using a conventional ink set, sufficient ozone resistance cannot be achieved in some cases when the amount of dye applied to a recording medium is small. In other words, the ozone resistance of an image recorded in a low-duty region may possibly be lower than the ozone resistance of an image recorded in a high-duty region (for example, a duty of 100%). Therefore, an ink-jet ink set capable of providing an achromatic image with excellent ozone resistance not only in a high-duty region but also in a low-duty region is desired.

In an ink set including a black ink containing carbon black, in the case of recording an achromatic image in a low-duty region using the black ink only, the achromatic image may possibly have a granular texture. Therefore, an ink-jet ink set capable of providing an achromatic image with a reduced granular texture (hereinafter referred to as excellent granularity) even in a low-duty region is desired.

SUMMARY

The invention has been made to solve at least one of the above problems. An advantage of some aspects of the invention is to provide an ink-jet ink set capable of providing an achromatic image having excellent color developability in a high-duty region and excellent granularity in a low-duty region.

The inventors have conducted intensive investigations to solve the above problems. As a result, the inventors have found that the above problems can be solved in such a way that the remaining optical density (hereinafter referred to as "ROD value") of each of a black ink, a cyan ink, a magenta ink, a yellow ink, and a gray ink is adjusted within a predetermined range, thereby completing the invention.

The scope of the invention is as described below.

An ink-jet ink set according to the invention includes a black ink containing carbon black; a cyan ink containing a first cyan dye; a magenta ink containing a first magenta dye; a yellow ink containing a first yellow dye; and a gray ink containing a second cyan dye, a second magenta dye, and a second yellow dye. The cyan ink has a ROD of 65% or more, the magenta ink has a ROD of 65% or more, the yellow ink has a ROD of 65% or more, the gray ink has a ROD of 65% or more, and the gray ink has an OD value of 1.40 to less than 2.30, the ROD being defined by the following equation (A), the OD value being defined by the following equation (B):

(ROD)=100×(the OD value of a monochrome image, recorded on a recording medium including a void-type ink-absorbing layer, having a duty of 100%, the monochrome image being left for 120 hours in a 23° C. environment having a relative humidity of 50% and an ozone concentration of 5 ppm)/(the OD value of the crude monochrome image)    (A)

and (the OD value of the gray ink)=(the OD value determined in such a way that 10 milligrams per square inch of the gray ink is applied to a recording medium including a void-type ink-absorbing layer)    (B).

In the ink-jet ink set, the gray ink further contains a black dye.

In the ink-jet ink set, in the gray ink, the content $C_B$ of the black dye and the sum of the content $C_C$ of the second cyan dye, the content $C_M$ of the second magenta dye, and the content $C_Y$ of the second yellow dye satisfy the following equation:

$$C_B:(C_C+C_M+C_Y)=0.05:0.95 \text{ to } 0.20:0.80 \quad (C).$$

In the ink-jet ink set, in the gray ink, the content $C_B$ of the black dye and the sum of the content $C_C$ of the second cyan dye, the content $C_M$ of the second magenta dye, and the content $C_Y$ of the second yellow dye satisfy the following equation:

$$C_B:(C_C+C_M+C_Y)=0.05:0.95 \text{ to } 0.15:0.85 \quad (C).$$

In the ink-jet ink set, the ROD of an aqueous solution containing 5% by mass of the second yellow dye, the ROD of an aqueous solution containing 5% by mass of the second cyan dye, and the ROD of an aqueous solution containing 5% by mass of the second magenta dye are higher than the ROD of an aqueous solution containing 5% by mass of the black dye.

In the ink-jet ink set, the black dye contains at least one selected from the group consisting of a compound represented by the following formula (1), a compound represented by the following formula (2), a compound represented by the following formula (3), a compound represented by the following formula (4), and a compound represented by the following formula (5):

(1)

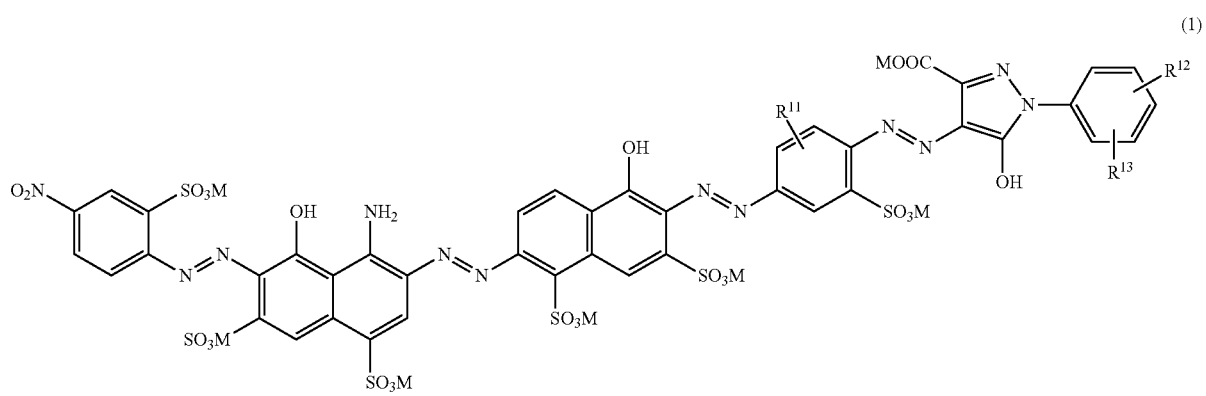

where $R^{11}$ represents a halogen atom, a hydrogen atom, an $SO_3M$ group, or a COOM group; $R^{12}$ and $R^{13}$ independently represent a hydrogen atom, an $SO_3M$ group, or a COOM group, provided that $R^{12}$ and $R^{13}$ do not simultaneously represent a hydrogen atom; and M represents a hydrogen atom, an alkali metal atom, or an ammonium group, (2)

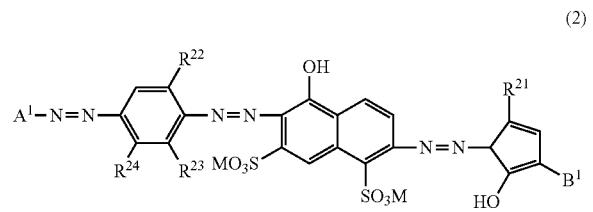

$R^{21}$ where represents a carboxy group, a (C1-C8 alkoxy)carbonyl group, a C1-C4 alkyl group which may be substituted with a (C1-C8 alkoxy)carbonyl group or a carboxy group, or a phenyl group which may be substituted with a hydroxy group, a sulfo group, or a carboxy group; $R^{22}$, $R^{23}$, and $R^{24}$ independently represent a hydrogen atom, a chlorine atom, a hydroxy group, a sulfo group, a carboxy group, a sulfamoyl group, a carbamoyl group, a C1-C4 alkyl group, a C1-C4 alkoxy group which may be substituted with a hydroxy group, a C1-C4 alkoxy group, a hydroxy(C1-C4 alkoxy) group, a sulfo group, or a carboxy group, a mono or di(C1-C4 alkyl)amino group which may be substituted with a hydroxy group, a sulfo group, or a carboxy group, a (C1-C4 alkyl)carbonylamino group which may be substituted with a hydroxy group or a carboxy group, an N'—(C1-C4 alkyl)ureido group which may be substituted with a hydroxy group, a sulfo group, or a carboxy group, a phenylamino group containing a benzene ring which may be substituted with a chlorine atom, a C1-C4 alkyl group, a nitro group, a sulfo group, or a carboxy group, a benzoylamino group containing a benzene ring which may be substituted with a chlorine atom, a C1-C4 alkyl group, a nitro group, a sulfo group, or a carboxy group, or a phenylsulfonylamino group containing a benzene ring which may be substituted with a chlorine atom, a C1-C4 alkyl group, a nitro group, a sulfo group, or a carboxy group; $A^1$ represents a substituted monovalent heterocyclic group represented by the following formula (21) or (22); and $B^1$ represents a phenyl group which may be substituted, a naphthyl group which may be substituted, a substituted phenyl group containing a substituent that is selected from the group consisting of a hydroxy group, a sulfo group, a carboxy group, a C1-C4 alkyl group, a C1-C4 alkoxy group, an amino group, a mono or di(C1-C4 alkyl)amino group, an acetylamino group, and a benzoylamino group containing a benzene ring which may be substituted with a chlorine atom, a C1-C4 alkyl group, a nitro group, a sulfo group, or a carboxy group, or a substituted naphthyl group containing a substituent that is selected from the group consisting of a hydroxy group, a sulfo group, a C1-C4 alkoxy group, and a phenylsulfonyloxy group containing a benzene ring which may be substituted with a methyl group, a nitro group, or a chlorine atom; M represents a hydrogen atom, an alkali metal atom, or an ammonium group, (3)

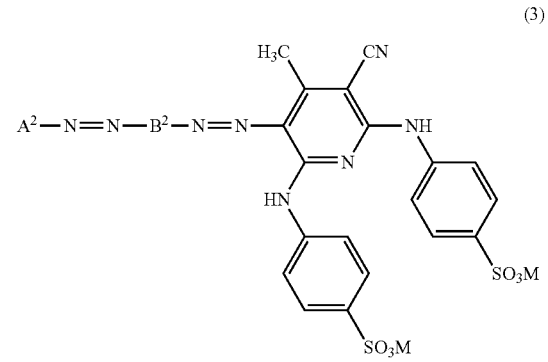

where $A^2$ represents a substituent represented by the following formula (31) or (32); $B^2$ represents a substituent represented by the following formula (33) or (34); and M represents a hydrogen atom, an alkali metal atom, or an ammonium group,

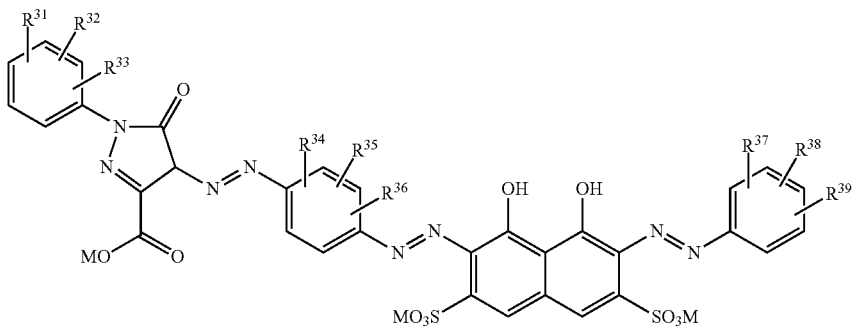

(4)

where $R^{31}$, $R^{32}$, $R^{33}$, $R^{34}$, $R^{35}$, $R^{36}$, $R^{37}$, $R^{38}$, and $R^{39}$ independently represent one selected from the group consisting of a hydrogen atom, a hydroxy group, an $SO_3M$ group, a $PO_3M_2$ group, a COOM group, a nitro group, and an amino group and M represents a hydrogen atom, an alkali metal atom, or an ammonium group, and

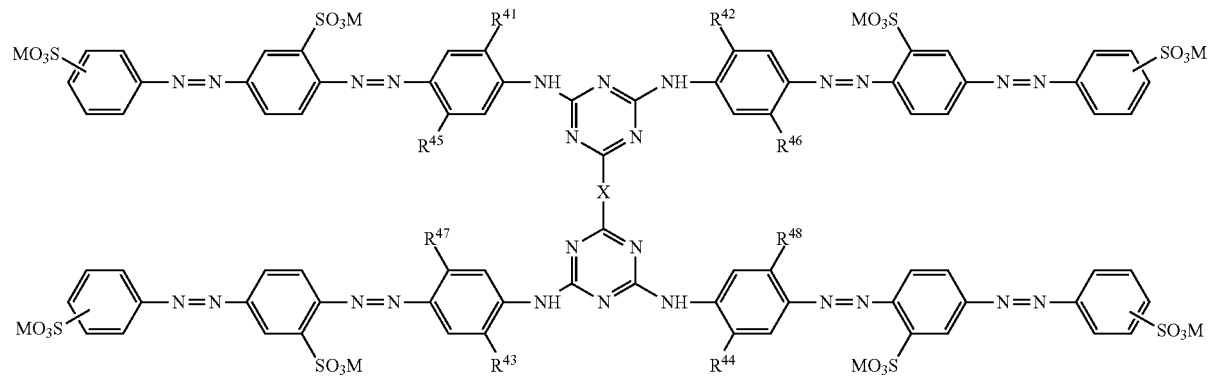

(5)

where $R^{41}$, $R^{42}$, $R^{43}$, $R^{44}$, $R^{45}$, $R^{46}$, $R^{47}$, and $R^{48}$ independently represent a hydrogen atom, a halogen atom, a C1-C4 alkyl group, a C1-C4 alkoxy group, a C1-C4 alkoxy group substituted with a sulfo group or a carboxy group, or a (C1-C4 alkyl)carbonylamino group; X represents a divalent crosslinking group; and M represents a hydrogen atom, an alkali metal atom, or an ammonium group:

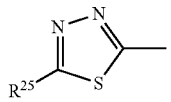

(21)

where $R^{25}$ represents a mercapto group or a (C1-C4 alkyl)thio group which may be substituted with a hydroxy group, a C1-C4 alkoxy group, a hydroxy(C1-C4 alkoxy) group, a sulfo group, or a carboxy group,

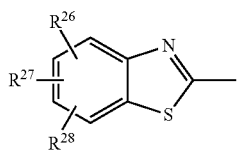

(22)

where $R^{26}$, $R^{27}$, and $R^{28}$ independently represent a hydrogen atom, a chlorine atom, a carboxy group, a sulfo group, a nitro group, a hydroxy group, a carbamoyl group, a sulfamoyl group, a C1-C4 alkyl group, a C1-C4 alkoxy group which may be substituted with a hydroxy group, a C1-C4 alkoxy group, a sulfo group, or a carboxy group, a (C1-C4 alkyl)sulfonyl group which may be substituted with a hydroxy group, a sulfo group, or a carboxy group, or a phenylsulfonyl group containing a benzene ring which may be substituted with a chlorine atom, a C1-C4 alkyl group, a nitro group, a sulfo group, or a carboxy group,

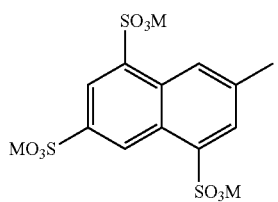

(31)

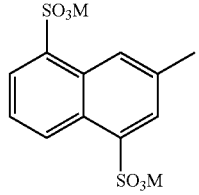

(32)

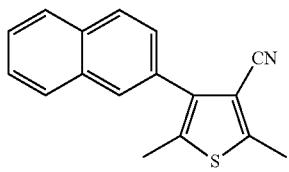

(33)

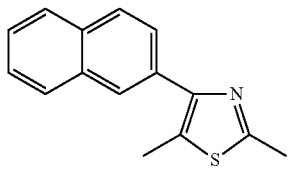

(34)

where M represents a hydrogen atom, an alkali metal atom, or an ammonium group.

In the ink-jet ink set, the ROD of an aqueous solution containing 5% by mass of the second yellow dye is higher than the ROD of an aqueous solution containing 5% by mass of the second cyan dye and the ROD of an aqueous solution containing 5% by mass of the second magenta dye.

In the ink-jet ink set, the ROD of the yellow ink is higher than the ROD of the cyan ink and the ROD of the magenta ink.

In the ink-jet ink set, at least one of the first cyan dye and the second cyan dye contains at least one of a compound represented by the following formula (6) and a compound represented by the following formula (7):

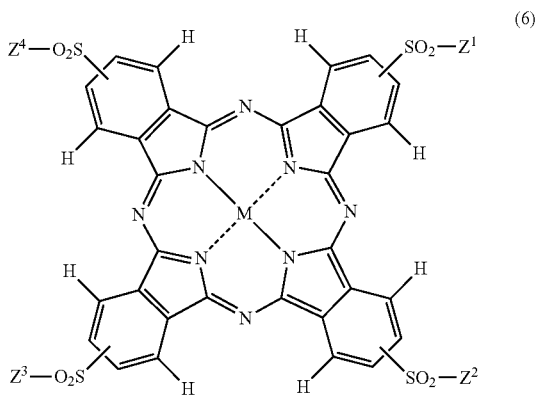

(6)

where M represents a hydrogen atom, a metal element, a metal oxide, a metal hydroxide, or a metal halide and $Z^1$ to $Z^4$ independently represent an alkyl group, a cycloalkyl group, an alkenyl group, an aralkyl group, an aryl group, or a heterocyclic group and particularly represent an alkyl, aryl, or heterocyclic group which may contain a substituent, and where A to D, which are each surrounded by a broken line, independently represent a benzene ring or six-membered nitrogen-containing heteroaromatic ring condensed with a porphyrazine ring, the number of the six-membered nitrogen-containing heteroaromatic rings being more than 0.00 to 3.00 on average, the remainder being benzene rings; E represents a C2-C12 alkylene group; X represents a sulfoanilino, carboxyanilino, phosphonoanilino, sulfonaphthylamino, carboxynaphthylamino, or phosphononaphthylamino group which may contain at least one substituent that is selected from the group consisting of a sulfo group, a carboxy group, a phosphono group, a sulfamoyl group, a carbamoyl group, a hydroxy group, a C1-C6 alkoxy group, an amino group, a mono(C1-C4 alkyl)amino group, a di(C1-C4 alkyl)amino group, a mono(C6-C10 aryl)amino group containing, a di(C6-C10 aryl)amino group, a (C1-C3 alkyl)carbonylamino group, a ureido group, a C1-C6 alkyl group, a nitro group, a cyano group, a halogen atom, a (C1-C6 alkyl)sulfonyl group, and a (C1-C6 alkyl)thio group; R represents a hydrogen atom, a sulfo group, a carboxy group, a phosphono group, a sulfamoyl group, a carbamoyl group, a hydroxy group, a C1-C6 alkoxy group, an amino group, a mono(C1-C6 alkyl)amino group, a di(C1-C6 alkyl)amino group, a monoarylamino group, a diarylamino group, a (C1-C3 alkyl)carbonylamino group, a ureido group, a C1-C6 alkyl group, a nitro group, a cyano group, a halogen atom, a (C1-C6 alkyl)sulfonyl group, or an alkylthio group; F represents a phenyl group or a six-membered nitrogen-containing heteroaromatic ring; a is an integer of 1 to 6; b is 0.00 to less than 3.90 on average; c is 0.10 to less than 4.00; and the sum of b and c is 1.00 to less than 4.00 on average.

In the ink-jet ink set, at least one of the first magenta dye and the second magenta dye contains at least one selected from the group consisting of a compound represented by following formula (8), a compound represented by following formula (9), and a compound represented by following formula (10):

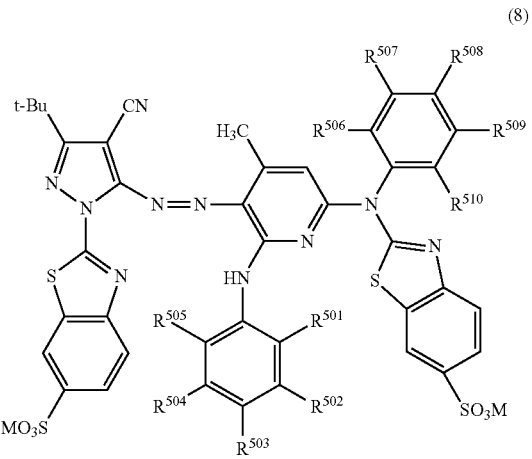

(8)

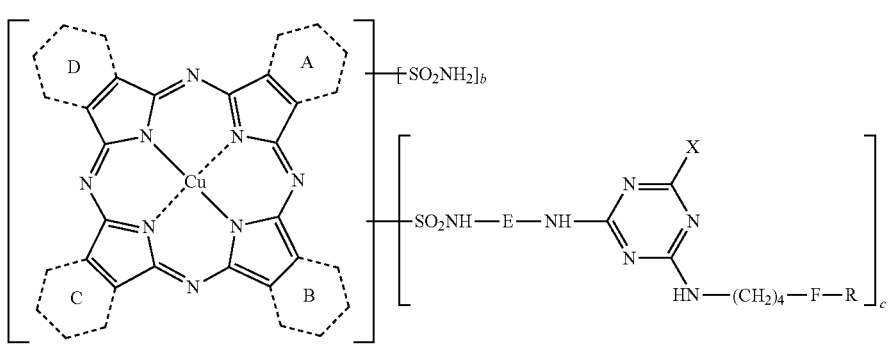

(7)

where $R^{501}$, $R^{502}$, $R^{503}$, $R^{504}$, $R^{505}$, $R^{506}$, $R^{507}$, $R^{508}$, $R^{509}$, and $R^{510}$ each represent a hydrogen atom, an alkyl group which may contain a substituent, a sulfo group, or a salt thereof and M represents a hydrogen atom, an alkali metal atom, or an ammonium group,

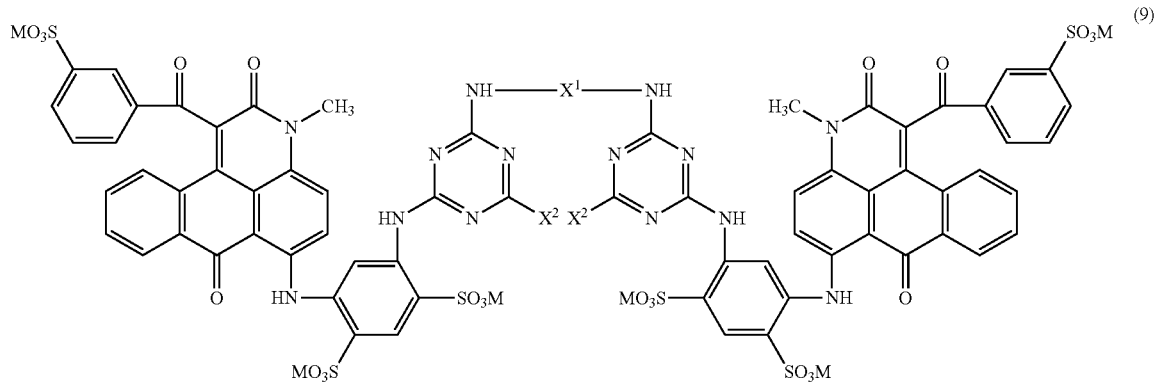

(9)

where $X^1$ represents an alkylene group, an alkylene group containing a phenylene group, or a group represented by the following formula (91); $X^2$ represents an amino group, a hydroxy group, or a chlorine atom; and M represents a hydrogen atom, an alkali metal atom, or an ammonium group, and

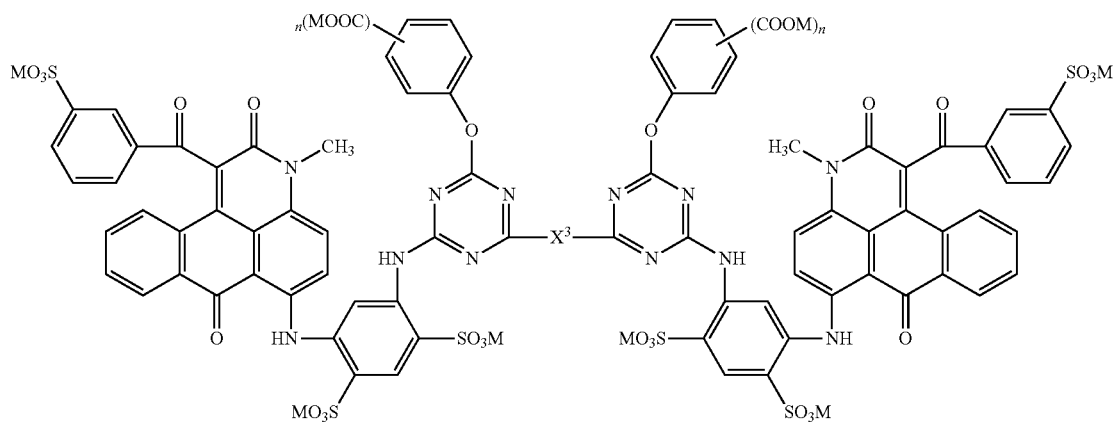

(10)

where M represents a hydrogen atom, an ammonium group, or an alkali metal atom; $X^3$ represents a diaminoalkylene group; and n is 1 or 2:

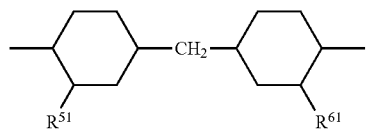

(91)

where $R^{61}$ represents a hydrogen atom or an alkyl group.

In the ink-jet ink set, at least one of the first yellow dye and the second yellow dye contains at least one selected from the group consisting of a compound represented by the following formula (11), a compound represented by the following formula (12), and a compound represented by the following formula (13):

(11)

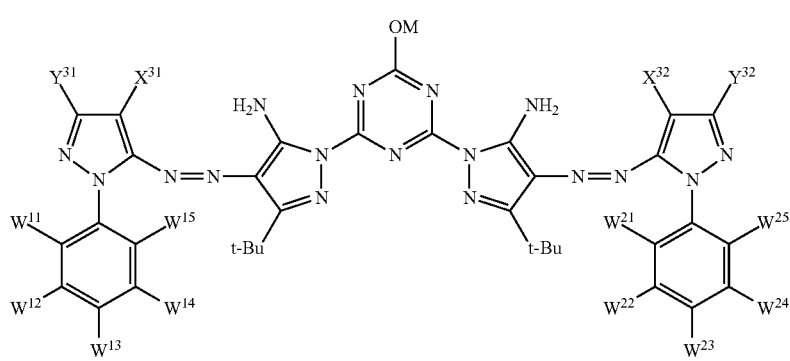

where $X^{31}$, $X^{32}$, $Y^{31}$, and $Y^{32}$ each represent a hydrogen atom or a cyano group; $W^{11}$, $W^{12}$, $W^{13}$, $W^{14}$, $W^{15}$, $W^{21}$, $W^{22}$, $W^{23}$, $W^{24}$, and $W^{25}$ each represent a hydrogen atom, a carboxy group, or a salt thereof; M represents a hydrogen atom, an ammonium group, or an alkali metal atom; and t-Bu represents a tertiary butyl group, (12)

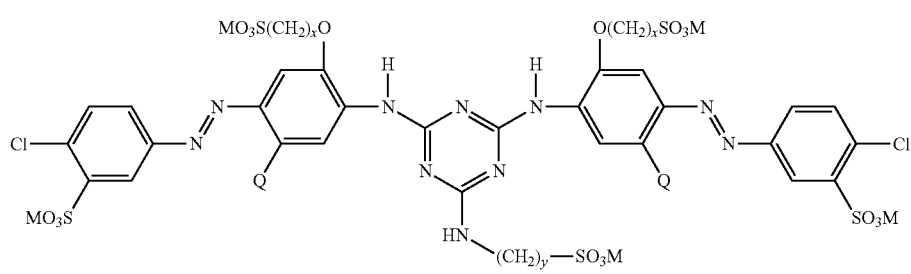

where Q represents a halogen atom; M represents a hydrogen atom, an alkali metal atom, or an ammonium group; x is an integer of 2 to 4, and y is an integer of 1 to 3, and (13)

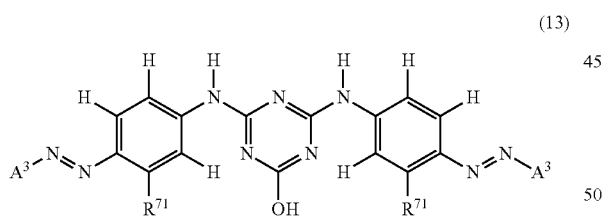

where $R^{71}$ represents a methoxy group or a methyl group and $A^3$ represents a 1,5-disulfonaphtho-3-yl group or a 1,5,7-trisulfonaphtho-2-yl group.

DESCRIPTION OF EXEMPLARY EMBODIMENTS

Embodiments of the invention will now be described in detail. The invention is not limited to the embodiments. Various modifications may be made without departing from the scope of the invention.

Ink-Jet Ink Set

An ink-jet ink set according to an embodiment of the invention includes a black ink containing carbon black; a cyan ink containing a first cyan dye; a magenta ink containing a first magenta dye; a yellow ink containing a first yellow dye; and a gray ink containing a second cyan dye, a second magenta dye, and a second yellow dye. The cyan ink has a ROD of 65% or more. The magenta ink has a ROD of 65% or more. The yellow ink has a ROD of 65% or more. The gray ink has a ROD of 65% or more and an OD value of 1.40 to less than 2.30. The ROD of each ink is defined by the following equation (A) and the OD value of the gray ink is defined by the following equation (B):

(ROD)=100×(the OD value of a monochrome image, recorded on a recording medium including a void-type ink-absorbing layer, having a duty of 100%, the monochrome image being left for 120 hours in a 23° C. environment having a relative humidity of 50% and an ozone concentration of 5 ppm)/(the OD value of the crude monochrome image)     (A)

and (the OD value of the gray ink)=(the OD value determined in such a way that 10 milligrams per square inch of the gray ink is applied to a recording medium including a void-type ink-absorbing layer)     (B).

In Equation (B), one inch is 2.54 cm.

1. Duty

The term "duty" as used herein refers to a value calculated by the following equation:

(Duty (%))=(the number of printed dots)/(vertical resolution×horizontal resolution)×100.

In the above equation, the number of printed dots is the number of printed dots per unit area and vertical resolution and horizontal resolution are the vertical resolution per unit length and the horizontal resolution per unit length, respectively.

2. Recording Medium 2-1. Recording Medium Including Void-Type Ink-Absorbing Layer In this embodiment, the ROD is defined for a monochrome image, recorded on a recording medium including a void-type ink-absorbing layer, having a duty of 100%. The term "void-type ink-absorbing layer" as used herein refers to an ink-absorbing layer containing a water-soluble resin (binder) and porous inorganic particles such as alumina particles or silicon particles.

The recording medium including the void-type ink-absorbing layer preferably has a surface with a 60-degree glossiness of 10 to 60. When the glossiness thereof is within the above range, an achromatic image with excellent glossiness can be obtained. In this embodiment, the glossiness can be measured with, for example, a glossmeter, HANDY GLOSSMETER™ PG-1, available from Nippon Denshoku Industries Co., Ltd. Examples of the recording medium including the void-type ink-absorbing layer include, but are not limited to, photo paper Crispia "High Gloss" available from Seiko Epson Corporation, photo paper "Gloss" available from Seiko Epson Corporation, Super Photo Paper™ SP-101 available from Canon Kabushiki Kaisha, and exclusive paper (glossy photo paper) BP-71™ available from Brother Industries, Ltd.

2-2. Other Recording Media

Recording media that can be used in this embodiment are not limited to the recording medium including the void-type ink-absorbing layer. Examples of the recording media include paper, cardboard, recording media including a swelling-type ink-absorbing layer, textile products, leather, sheets, films, plastic, glass, ceramic, and metal. Incidentally, the swelling-type ink-absorbing layer is made of, for example, a hydrophilic polymer (water-soluble resin) such as gelatin, polyvinyl alcohol, polyvinylpyrrolidone, or polyethylene oxide and absorbs ink because the hydrophilic polymer is swollen by ink.

3. Achromatic Image

In this embodiment, an achromatic image is not particularly limited. The achromatic image is preferably an image having an a*-value of −10 to 10 and a b*-value of −10 to 10 and more preferably an a*-value of −5 to 5 and a b*-value of −5 to 5 in the L*a*b* space. When the a*-value and the b*-value are within the above ranges, an achromatic image with an excellent hue can be obtained. Incidentally, the hue can be measured in such a way that a record is recorded on a recording medium using an ink-jet printer and is then measured for color using a spectrophotometer, i1™, available from Xrite.

4. ROD

The ROD can be determined in such a way that a monochrome image having a duty of 100% is prepared on the recording medium including the void-type ink-absorbing layer, the OD value (hereinafter referred to as "pre-leaving OD value") of the monochrome image and the OD value (hereinafter referred to as "post-leaving OD value") of the monochrome image left for 120 hours in a 23° C. environment having a relative humidity of 50% and an ozone concentration of 5 ppm are determined, and the ROD is calculated from these OD values by the following equation:

(ROD)=100×(pre-leaving OD value)/(post-leaving OD value)    (A).

Incidentally, the recording medium including the void-type ink-absorbing layer is not particularly limited and may be the same as that described in above "2. Recording medium".

The OD value can be measured with a reflection densitometer, Spectrolino™, available from Gretag.

The ROD of the gray ink (hereinafter referred to as "ROD (gray ink)"), the ROD of the cyan ink (hereinafter referred to as "ROD (cyan ink)"), the ROD of the magenta ink (hereinafter referred to as "ROD (magenta ink)"), and the ROD of the yellow ink (hereinafter referred to as "ROD (yellow ink)") can be adjusted by adjusting the concentration of a dye or using two or more dyes in combination as described below.

The ROD (gray ink) is preferably 65% or more, more preferably 70% or more, further more preferably 73% or more, and still further more preferably 75% or more. The ROD (cyan ink) is preferably 65% or more, more preferably 70% or more, further more preferably 75% or more, and still further more preferably 80% or more. The ROD (magenta ink) is preferably 65% or more, more preferably 70% or more, further more preferably 73% or more, and still further more preferably 76% or more. The ROD (yellow ink) is preferably 65% or more, more preferably 70% or more, further more preferably 80% or more, and still further more preferably 88% or more. When the RODs are within the above preferred ranges, even color images including achromatic images can achieve excellent ozone resistance.

The ROD (yellow ink) of the yellow ink is preferably higher than the ROD (cyan ink) of the cyan ink and the ROD (magenta ink) of the magenta ink. In particular, the ROD (yellow ink) preferably satisfies the following conditions:

ROD (yellow ink)>ROD (cyan ink) and

ROD (yellow ink)>ROD (magenta ink).

Among the cyan ink, the magenta ink, and the yellow ink (hereinafter also collectively referred to as "color inks"), the yellow ink absorbs light with a shorter wavelength and therefore tends to be relatively inferior in light resistance. Hence, when the ROD of the yellow ink is higher than the ROD of the cyan ink and the ROD of the magenta ink, achromatic images with excellent ozone resistance can be obtained.

In this embodiment, the ROD of an aqueous solution containing 5% by mass of the second cyan dye, the ROD of an aqueous solution containing 5% by mass of the second magenta dye, the ROD of an aqueous solution containing 5% by mass of the second yellow dye, and the ROD of an aqueous solution containing 5% by mass of a black dye which may be contained in the gray ink are based on Equation (A) and are hereinafter referred to as ROD (cyan dye), ROD (magenta dye), ROD (yellow dye), and ROD (black dye), respectively. These RODs can be adjusted by adjusting the concentration of a dye or using two or more dyes in combination as described below.

In the gray ink, the ROD (black dye) is preferably 65% or more, more preferably 70% or more, further more preferably 73% or more, and still further more preferably 75% or more. The ROD (cyan dye) is preferably 65% or more, more preferably 70% or more, further more preferably 75% or more, and still further more preferably 80% or more. The ROD (magenta dye) is preferably 65% or more, more preferably 70% or more, further more preferably 73% or more, and still further more preferably 76% or more. The ROD (yellow dye) is preferably 65% or more, more preferably 70% or more, further more preferably 80% or more, and still further more preferably 88% or more. When these RODs are within the above preferred ranges, even color images including achromatic images can achieve excellent ozone resistance.

In the gray ink, the ROD (yellow dye) of the aqueous solution containing 5% by mass of the second yellow dye is preferably higher than the ROD (cyan dye) of the aqueous solution containing 5% by mass of the second cyan dye and the ROD (magenta dye) of the aqueous solution containing 5% by mass of the second magenta dye. In particular, the ROD (yellow dye) of the aqueous solution containing 5% by mass of the second yellow dye preferably satisfies the following conditions:

ROD (yellow dye)>ROD (cyan dye) and

ROD (yellow dye)>ROD (magenta dye).

Among dyes contained in the gray ink, the second yellow dye absorbs light with a shorter wavelength and therefore tends to be relatively inferior in light resistance. Hence, when the ROD of the second yellow dye is higher than the ROD of the second cyan dye and the ROD of the second magenta dye, achromatic images with excellent ozone resistance can be obtained.

When the gray ink contains the black dye, the content $C_B$ of the black dye and the sum of the content $C_C$ of the second cyan dye, the content $C_M$ of the second magenta dye, and the content $C_Y$ of the second yellow dye preferably satisfy the following equation because images with excellent granularity can be obtained:

$$C_B:(C_C+C_M+C_Y)=0.05:0.95 \text{ to } 0.20:0.80 \tag{C}$$

Furthermore, $C_B$ and the sum of $C_C$, $C_M$, and $C_Y$ more preferably satisfy the following equation because images with more excellent granularity can be obtained:

$$C_B:(C_C+C_M+C_Y)=0.05:0.95 \text{ to } 0.15:0.85 \tag{C1}$$

When the gray ink contains the black dye, the ROD (yellow dye), the ROD (cyan dye), and the ROD (magenta dye) are preferably higher than the ROD (black dye). In particular, the ROD (yellow dye), the ROD (cyan dye), and the ROD (magenta dye) preferably satisfy the following conditions:

ROD (cyan dye)>ROD (black dye),

ROD (magenta dye)>ROD (black dye), and

ROD (yellow dye)>ROD (black dye).

When Equation (B) is satisfied, the content of the second cyan dye, the content of the second magenta dye, and the content of the second yellow dye are higher than the content of the black dye and therefore the RODs of the other color inks have a larger influence on the ozone resistance of records than the ROD (black dye). Hence, when the above conditions are satisfied, achromatic images with excellent ozone resistance can be obtained.

Gray Ink

In this embodiment, the ink-jet ink set includes the gray ink. In conventional ink sets including a black pigment-containing ink and dye color inks, there is a problem in that an achromatic image or a color image including an achromatic region is unlikely to have excellent granularity or color developability.

For example, in the case of forming an achromatic image using the black pigment-containing ink, an image with excellent granularity is unlikely to be obtained in a low-duty region. On the other hand, in the case of forming an achromatic image using the dye color inks (a dye cyan ink, a dye magenta ink, and a dye yellow ink) in combination, color-mixed dots formed on a recording medium are not uniform because of the occurrence of misalignment during landing and therefore, as a result, the hue is not uniform in some cases.

Furthermore, in the case of performing so-called serial ink-jet printing, the order of droplets of the dye color inks landing on a recording medium is reversed between the supply and return of a recording head ejecting the dye color inks in the main scanning direction thereof in some cases. The hue of an achromatic portion formed during the supply and hue of an achromatic portion formed during the return are not uniform in some cases because the order of the landing dye color ink droplets differs. This is because the mixing condition of dyes on a surface of the recording medium depending on the order of the landing dye color ink droplets.

However, in this embodiment, the ink-jet ink set includes the gray ink and therefore an achromatic image or a color image including an achromatic region can be formed using the ink-jet ink set so as to have excellent granularity and color developability.

Herein, the gray ink is preferably capable of recording the achromatic image without being mixed with the other inks when the gray ink is applied to a white recording medium (in which $L^*$ is 70 or more and the $a^*$-value and the $b^*$-value both range from −10 to 10).

The gray ink has an OD value of 1.40 to less than 2.30 as determined by Equation (B). The use of the gray ink allows an achromatic image including a high-duty region with excellent color developability and a low-duty region with excellent granularity to be obtained.

5. Inks

Dyes and additives that may be contained in the black ink, the cyan ink, the magenta ink, and/or the yellow ink are described below.

5-1. Carbon Black

In this embodiment, the ink-jet ink set includes the black ink and the black ink contains carbon black. Since the black ink contains carbon black, the black ink has excellent color developability, is useful in obtaining an image with reduced blurring, and therefore is preferred as ink for recording text documents. The dispersion morphology of carbon black is not particularly limited. For example, surface-treated carbon black or dispersant-treated carbon black may be used.

Surface-treated carbon black is one that is prepared in such a way that a hydrophilic group such as a hydroxy group, a carboxy group, a sulfo group, or a phospho group is directly or indirectly bonded to the surface of carbon black by physical or chemical treatment. Therefore, surface-treated carbon black is dispersible in an aqueous solvent and is also referred to as self-dispersible carbon black (hereinafter also referred to as "self-dispersible CB"). The hydrophilic group may form a salt with an alkali metal, ammonia, or an organic amine.

Dispersant-treated carbon black is one that is prepared in such a way that carbon black is dispersed using a surfactant or resin. Dispersant-treated carbon black is also referred to as "polymer-dispersible CB". The surfactant or the resin may be a known substance. The term "polymer-dispersible CB" includes resin-coated carbon black. Resin-coated carbon black can be obtained by an acid precipitation process, a phase-inversion emulsification process, a miniemulsion polymerization process, or the like.

Carbon black used herein may be one produced by, for example, a known process such as a contact process, a furnace process, or a thermal process. In this embodiment, preferred examples of carbon black include carbon blacks, such as No. 2300, No. 900, MCF 88, No. 20B, No. 33, No.

40, No. 45, No. 52, MA 7, MA 8, MA 100, and No. 2200B, available from Mitsubishi Chemical Corporation; carbon blacks, such as Color Black FW 1, Color Black FW 2, Color Black FW 2V, Color Black FW 18, Color Black FW 200, Color Black 5150, Color Black 5160, Color Black 5170, Printex 35, Printex U, Printex V, Printex 140U, Special Black 6, Special Black 5, Special Black 4A, Special Black 4, and Special Black 250, available from Degussa AG; carbon blacks, such as Conductex SC, Raven 1255, Raven 5750, Raven 5250, Raven 5000, Raven 3500, Raven 1255, and Raven 700, available from Columbian Carbon Japan, Ltd.; and Regal 400R, Regal 330R, Regal 660R, Mogul L, Monarch 700, Monarch 800, Monarch 880, Monarch 900, Monarch 1000, Monarch 1100, Monarch 1300, Monarch 1400, and Elftex 12, available from Cabot Corporation. These carbon blacks may be used alone or in combination.

The content of carbon black in the black ink is not particularly limited and is preferably 6% by mass or more. When the content of carbon black therein is 6% by mass or more, a record formed using the black ink tends to have high color developability.

When the content of carbon black in the black ink is 6% by mass or more, the self-dispersible CB is preferably used. In the case of using self-dispersible CB, the amount of a dispersant used can be reduced and therefore the foaming of ink due to the dispersant can be reduced; hence, ink with good ejection stability is readily produced. Furthermore, a significant increase in viscosity due to the dispersant is reduced and therefore a larger amount of carbon black can be contained; hence, the density of a print can be sufficiently increased and handling is easy.

The self-dispersible CB preferably has a volume-average particle size of 50 nm to 250 nm as determined by a laser diffraction scattering method from the viewpoints of the storage stability of ink, the prevention of clogging of nozzles, and the like.

5-2. Cyan Dyes

In this embodiment, the cyan ink and the gray ink contain the first cyan dye and the second cyan dye, respectively. The first and second cyan dyes are not particularly limited within the scope of the invention and may be the same or different from each other. For example, Cyan Dyes 1 to 3 below can be used as both the first and second cyan dyes.

5-2-1. Cyan Dye 1

Cyan Dye 1 is a compound represented by the following formula:

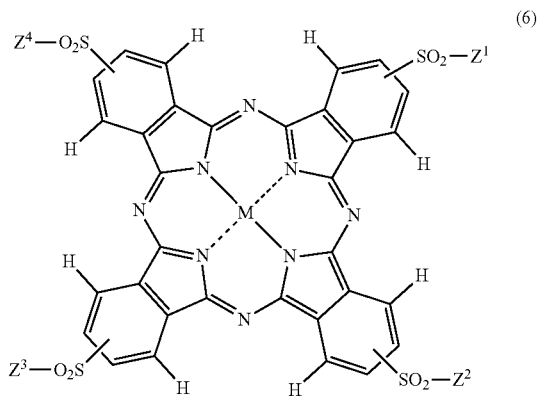

(6)

where M represents a hydrogen atom, a metal element, a metal oxide, a metal hydroxide, or a metal halide and $Z^1$ to $Z^4$ independently represent an alkyl group, a cycloalkyl group, an alkenyl group, an aralkyl group, an aryl group, or a heterocyclic group and particularly represent an alkyl, aryl, or heterocyclic group which may contain a substituent.

The compound represented by Formula (6) is not particularly limited. Preferred examples of the compound represented by Formula (6) include Compounds A to K shown in Table 1 below.

TABLE 1

| | M | $Z^1$ | $Z^2$ | $Z^3$ | $Z^4$ |
|---|---|---|---|---|---|
| Compound A | Cu | —$(CH_2)_3SO_3Na$ | —$(CH_2)_3SO_3Na$ | —$(CH_2)_3SO_3Na$ | —$(CH_2)_3SO_3Na$ |
| Compound B | Cu | —$(CH_2)_3SO_3Li$ | —$(CH_2)_3SO_3Li$ | —$(CH_2)_3SO_3Li$ | —$(CH_2)_3SO_3Li$ |
| Compound C | Cu | —$(CH_2)_3CO_2K$ | —$(CH_2)_3CO_2K$ | —$(CH_2)_3CO_2K$ | —$(CH_2)_3CO_2K$ |
| Compound D | Cu | —$CH_2CH(OH)CH_2SO_3Li$ | —$CH_2CH(OH)CH_2SO_3Li$ | —$CH_2CH(OH)CH_2SO_3Li$ | —$CH_2CH(OH)CH_2SO_3Li$ |
| Compound E | Cu | —$(CH_2)_2CH(CH_3)SO_2Li$ | —$(CH_2)_2CH(CH_3)SO_3Li$ | —$(CH_2)_2CH(CH_3)SO_3Li$ | —$(CH_2)_2CH(CH_3)SO_3Li$ |
| Compound F | Cu | —$(CH_2)_3SO_3Li$ | —$(CH_2)_3SO_3Li$ | —$(CH_2)_3SO_3Li$ | —$(CH_2)_3SO_2NHCH_2CH(OH)CH_3$ |
| Compound G | Cu | —$(CH_2)_3SO_3Li$ | —$(CH_2)_3SO_3Li$ | —$(CH_2)_3SO_2NHCH_2CH(OH)CH_3$ | —$(CH_2)_3SO_2NHCH_2CH(OH)CH_3$ |
| Compound H | Cu | —$(CH_2)_3SO_3Li$ | —$(CH_2)_3SO_3Li$ | —$(CH_2)_3SO_3Li$ | —$(CH_2)_3SO_2NHCH(CH_3)CH_2OH$ |
| Compound I | Cu | —$(CH_2)_3SO_3Li$ | —$(CH_2)_3SO_3Li$ | —$(CH_2)_3SO_2NHCH(CH_3)CH_2OH$ | —$(CH_2)_3SO_2NHCH(CH_3)CH_2OH$ |
| Compound J | Cu | —$(CH_2)_3SO_3Li$ | —$(CH_2)_3SO_3Li$ | —$(CH_2)_3SO_3Li$ | —$(CH_2)_3SO_2N(C_2H_4OH)_2$ |

TABLE 1-continued

| | M | $Z^1$ | $Z^2$ | $Z^3$ | $Z^4$ |
|---|---|---|---|---|---|
| Compound K | Cu | —(CH$_2$)$_3$SO$_3$Li | —(CH$_2$)$_3$SO$_3$Li | —(CH$_2$)$_3$SO$_3$Li | —(CH$_2$)$_5$CO$_2$Li |

5-2-2. Cyan Dye 2

Cyan Dye 2 is a compound in which 1.20 of Rings A to D below are preferably pyridine rings condensed in positions 2 and 3 and 2.80 of Rings A to D are preferably benzene rings and which is represented by the following formula:

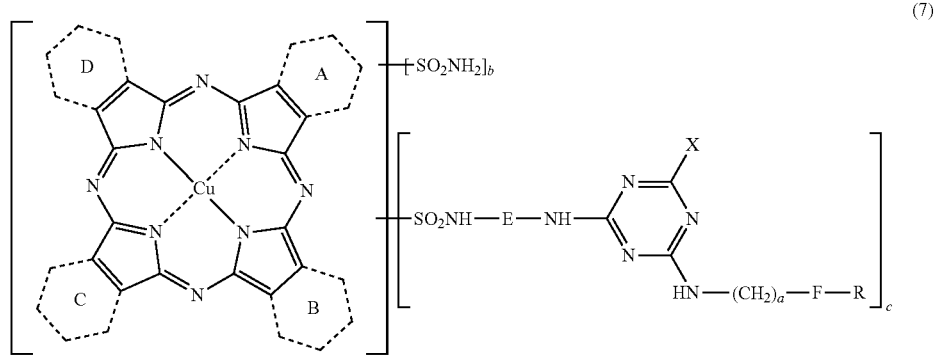

(7)

where A to D, which are each surrounded by a broken line, independently represent a benzene ring or six-membered nitrogen-containing heteroaromatic ring condensed with a porphyrazine ring, the number of the six-membered nitrogen-containing heteroaromatic rings being more than 0.00 to 3.00 on average, the remainder being benzene rings; E represents a C2-C12 alkylene group; X represents a sulfoanilino, carboxyanilino, phosphonoanilino, sulfonaphthylamino, carboxynaphthylamino, or phosphononaphthylamino group which may contain at least one substituent that is selected from the group consisting of a sulfo group, a carboxy group, a phosphono group, a sulfamoyl group, a carbamoyl group, a hydroxy group, a C1-C6 alkoxy group, an amino group, a mono(C1-C4 alkyl)amino group, a di(C1-C4 alkyl)amino group, a mono(C6-C10 aryl)amino group containing, a di(C6-C10 aryl)amino group, a (C1-C3 alkyl) carbonylamino group, a ureido group, a C1-C6 alkyl group, a nitro group, a cyano group, a halogen atom, a (C1-C6 alkyl)sulfonyl group, and a (C1-C6 alkyl)thio group; R represents a hydrogen atom, a sulfo group, a carboxy group, a phosphono group, a sulfamoyl group, a carbamoyl group, a hydroxy group, a C1-C6 alkoxy group, an amino group, a mono(C1-C6 alkyl)amino group, a di(C1-C6 alkyl)amino group, a monoarylamino group, a diarylamino group, a (C1-C3 alkyl)carbonylamino group, a ureido group, a C1-C6 alkyl group, a nitro group, a cyano group, a halogen atom, a (C1-C6 alkyl)sulfonyl group, or an alkylthio group; F represents a phenyl group or a six-membered nitrogen-containing heteroaromatic ring; a is an integer of 1 to 6; b is 0.00 to less than 3.90 on average; c is 0.10 to less than 4.00; and the sum of b and c is 1.00 to less than 4.00 on average.

The compound represented by Formula (7) is not particularly limited and, in particular, is preferably a compound represented by the following formula:

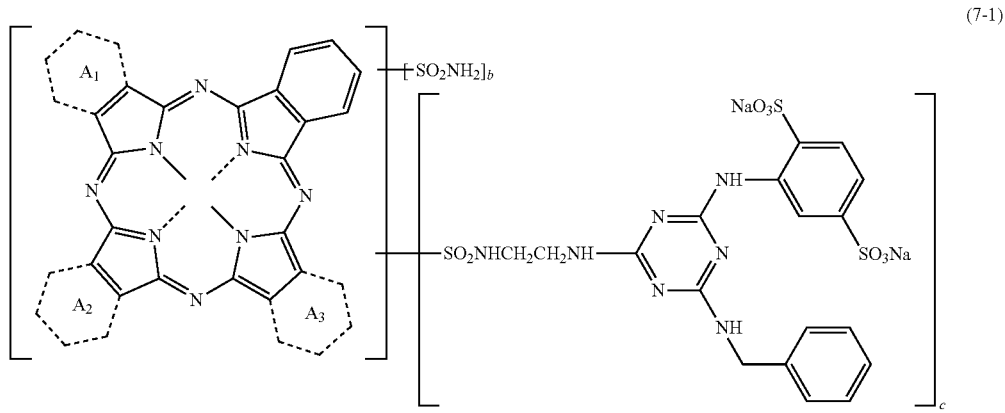

(7-1)

where $A_1$ to $A_3$ are the same as above B to D and b and c are the same as those described above.

Each of the first and second cyan dyes may be a mixture of two or more types of dyes. The first or second cyan dye may be, for example, a mixture of Cyan Dye 1 and Cyan Dye 2.

The first and second cyan dyes are not limited to the above compounds within the scope of the invention. The first and second cyan dyes may contain, for example, at least one selected from the group consisting of C.I. Direct Blue 1, C.I. Direct Blue 6, C.I. Direct Blue 8, C.I. Direct Blue 15, C.I. Direct Blue 22, C.I. Direct Blue 25, C.I. Direct Blue 71, C.I. Direct Blue 76, C.I. Direct Blue 80, C.I. Direct Blue 86, C.I. Direct Blue 87, C.I. Direct Blue 90, C.I. Direct Blue 106, C.I. Direct Blue 108, C.I. Direct Blue 123, C.I. Direct Blue 163, C.I. Direct Blue 165, C.I. Direct Blue 199, C.I. Direct Blue 226, C.I. Acid Blue 9, C.I. Acid Blue 22, C.I. Acid Blue 29, C.I. Acid Blue 40, C.I. Acid Blue 59, C.I. Acid Blue 62, C.I. Acid Blue 93, C.I. Acid Blue 102, C.I. Acid Blue 104, C.I. Acid Blue 112, C.I. Acid Blue 113, C.I. Acid Blue 117, C.I. Acid Blue 120, C.I. Acid Blue 167, C.I. Acid Blue 175, C.I. Acid Blue 183, C.I. Acid Blue 229, C.I. Acid Blue 234, C.I. Basic Blue 1, C.I. Basic Blue 3, C.I. Basic Blue 5, C.I. Basic Blue 7, C.I. Basic Blue 9, C.I. Basic Blue 24, C.I. Basic Blue 25, C.I. Basic Blue 26, C.I. Basic Blue 28, C.I. Basic Blue 29, C.I. Reactive Blue 7, C.I. Reactive Blue 13, and C.I. Reactive Blue 49. These colorants may be used alone or in combination.

5-3. Magenta Dye

In this embodiment, the magenta ink and the gray ink contain the first magenta dye and the second magenta dye, respectively. The first and second magenta dyes are not particularly limited within the scope of the invention and may be the same or different from each other. For example, Magenta Dyes 1 to 3 below can be used as both the first and second magenta dyes.

5-3-1. Magenta Dye 1

Magenta Dye 1 is a compound represented by the following formula:

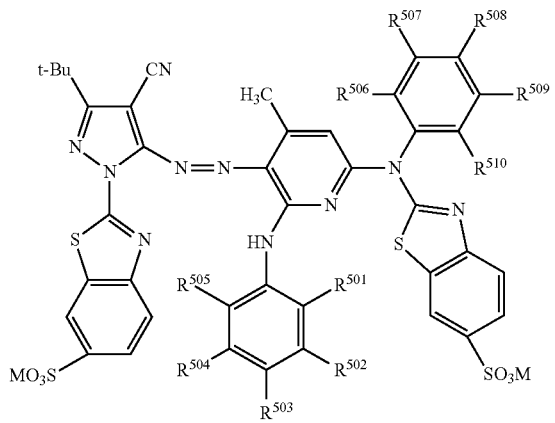

where $R^{501}$, $R^{502}$, $R^{503}$, $R^{504}$, $R^{505}$, $R^{506}$, $R^{507}$, $R^{508}$, $R^{509}$, and $R^{510}$ each represent a hydrogen atom, an alkyl group, a sulfo group, or a salt thereof; when $R^{501}$ and $R^{505}$ are alkyl groups, the number of carbon atoms contained in each of the alkyl groups ($R^{501}$ and $R^{505}$) is preferably 3 or more; when $R^{506}$ and $R^{510}$ are alkyl groups, the number of carbon atoms contained in each of these alkyl groups ($R^{506}$ and $R^{510}$) is preferably 3 or more; the alkyl groups may contain a substituent; and M represents a hydrogen atom, an alkali metal atom, or an ammonium group.

The compound represented by Formula (8) is not particularly limited. Preferred examples of the compound represented by Formula (8) include compounds represented by the following formulae:

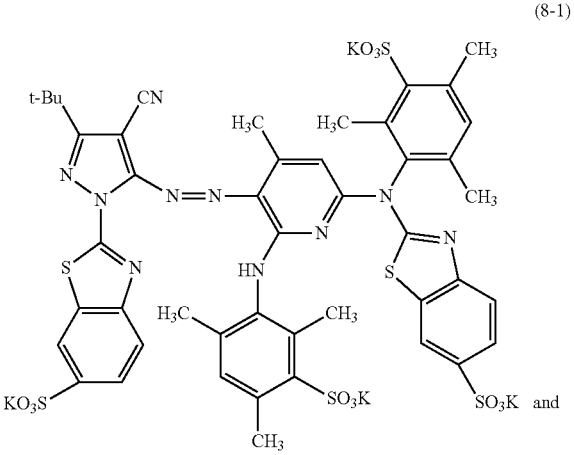

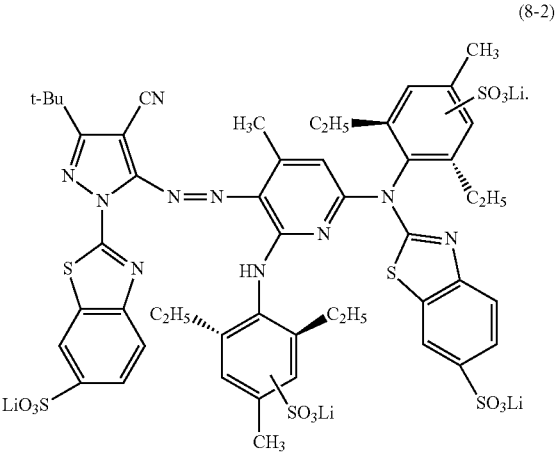

5-3-2. Magenta Dye 2

Magenta Dye 2 is a compound represented by the following formula:

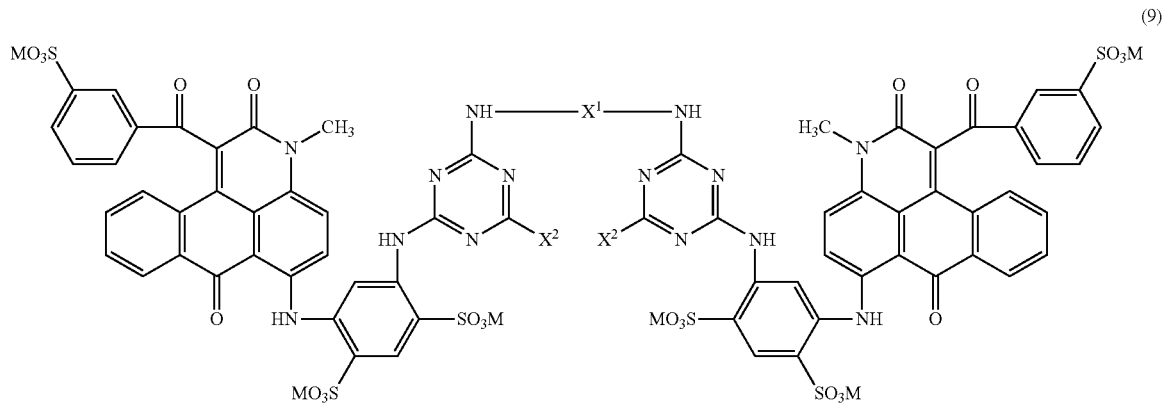

(9)

where $X^2$ represents an amino group, a hydroxy group, or a chlorine atom; M represents a hydrogen atom, an alkali metal atom, or an ammonium group; and $X^1$ represents an alkylene group, an alkylene group containing a phenylene group, or a group represented by the following formula:

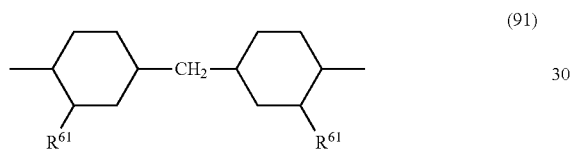

(91)

where $R^{61}$ represents a hydrogen atom or an alkyl group.

The compound represented by Formula (9) is not particularly limited and, in particular, is preferably a compound represented by the following formula:

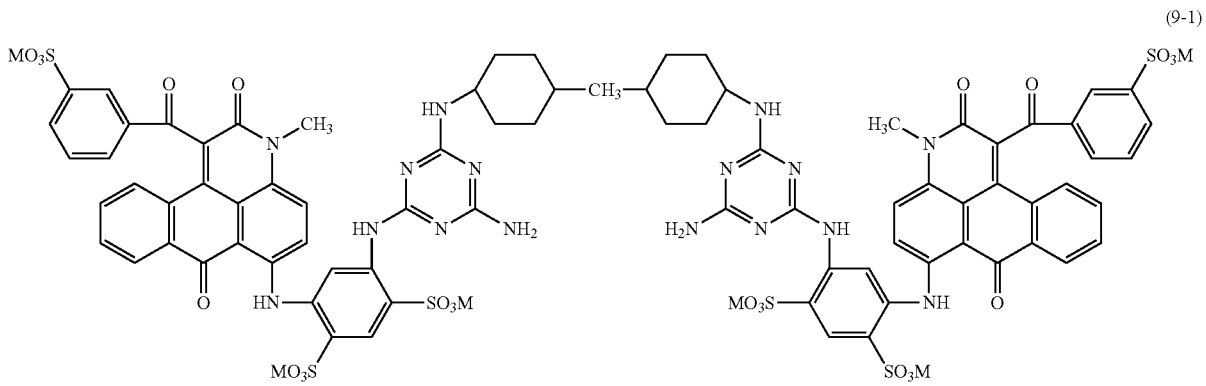

(9-1)

where M is the same as above.

5-3-3. Magenta Dye 3

Magenta Dye 3 is a compound represented by the following formula:

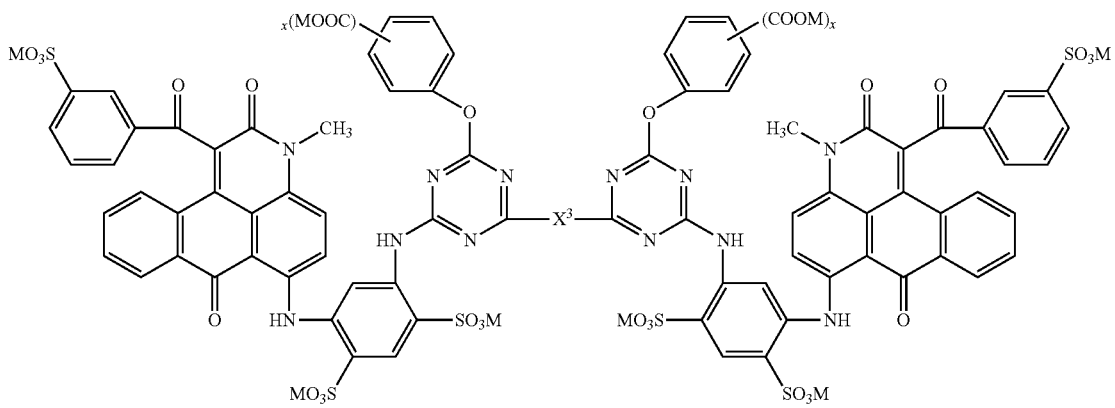

(10)

where M represents a hydrogen atom, an ammonium group, or an alkali metal atom; $X^3$ represents a diaminoalkylene group; and n is 1 or 2.

The compound represented by Formula (10) is not particularly limited and, in particular, is preferably a compound represented by the following formula:

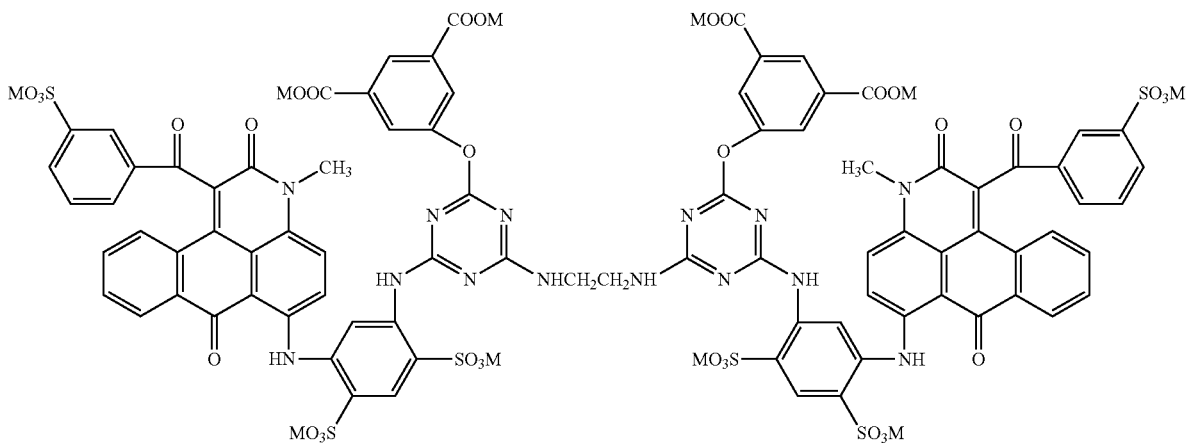

(10-1)

where M is the same as above and preferably represents at least one of a sodium atom and an ammonium group.

Each of the first and second magenta dyes may be a mixture of two or more types of dyes. The first or second magenta dye may be, for example, a mixture of two or more selected from Magenta Dyes 1 to 3.

The first or second magenta dye is not particularly limited within the scope of the invention. The first and second magenta dyes may contain, for example, at least one selected from the group consisting of C.I. Direct Red 4, C.I. Direct Red 17, C.I. Direct Red 28, C.I. Direct Red 37, C.I. Direct Red 63, C.I. Direct Red 75, C.I. Direct Red 79, C.I. Direct Red 80, C.I. Direct Red 81, C.I. Direct Red 83, C.I. Direct Red 254, C.I. Acid Red 1, C.I. Acid Red 6, C.I. Acid Red 8, C.I. Acid Red 18, C.I. Acid Red 32, C.I. Acid Red 35, C.I. Acid Red 37, C.I. Acid Red 42, C.I. Acid Red 52, C.I. Acid Red 85, C.I. Acid Red 88, C.I. Acid Red 115, C.I. Acid Red 133, C.I. Acid Red 134, C.I. Acid Red 154, C.I. Acid Red 186, C.I. Acid Red 249, C.I. Acid Red 289, C.I. Acid Red 407, C.I. Basic Red 9, C.I. Basic Red 12, C.I. Basic Red 13, C.I. Reactive Red 4, C.I. Reactive Red 23, C.I. Reactive Red 24, C.I. Reactive Red 31, and C.I. Reactive Red 56. These colorants may be used alone or in combination.

5-4. Yellow Dyes

In this embodiment, the yellow ink and the gray ink contain the first yellow dye and the second yellow dye, respectively. The first and second yellow dyes are not particularly limited within the scope of the invention and may be the same or different from each other. For example, Yellow Dyes 1 to 3 below can be used as both the first and second yellow dyes.

5-4-1. Yellow Dye 1

Yellow Dye 1 is a compound represented by the following formula:

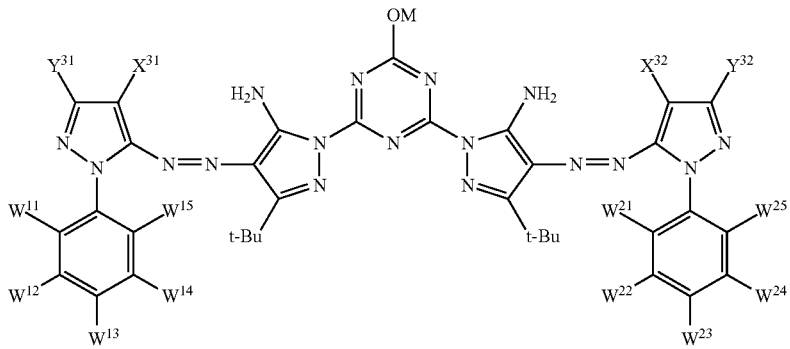

(11)

where $X^{31}$, $X^{32}$, $Y^{31}$, and $Y^{32}$ each represent a hydrogen atom or a cyano group; $W^{11}$, $W^{12}$, $W^{13}$, $W^{14}$, $W^{15}$, $W^{21}$, $W^{22}$, $W^{23}$, $W^{24}$, and $W^{25}$ each represent a hydrogen atom, a carboxy group, or a salt thereof; M represents a hydrogen atom, an ammonium group, or an alkali metal atom and is preferably the alkali metal atom; and t-Bu represents a tertiary butyl group.

The compound represented by Formula (11) is not particularly limited and, in particular, is a compound represented by the following formula:

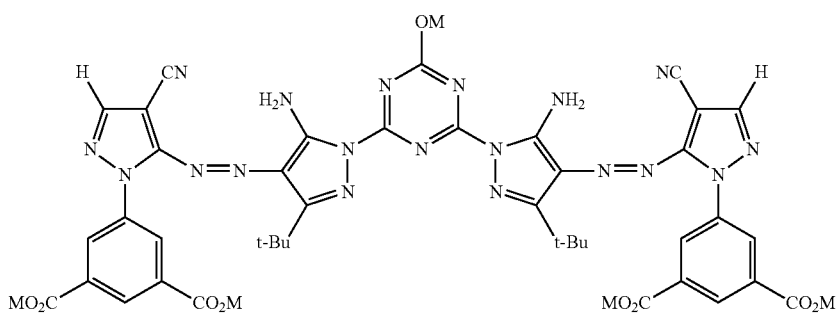

(11-1)

where M is the same as above and is preferably K.

5-4-2. Yellow Dye 2

Yellow Dye 2 is a compound represented by the following formula:

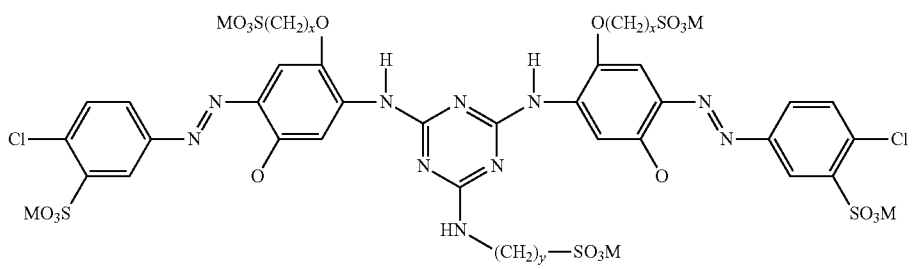

(12)

where Q represents a halogen atom; M represents a hydrogen atom, an alkali metal atom, or an ammonium group; x is an integer of 2 to 4, and y is an integer of 1 to 3.

The compound represented by Formula (12) is not particularly limited and, in particular, is preferably a compound represented by the following formula:

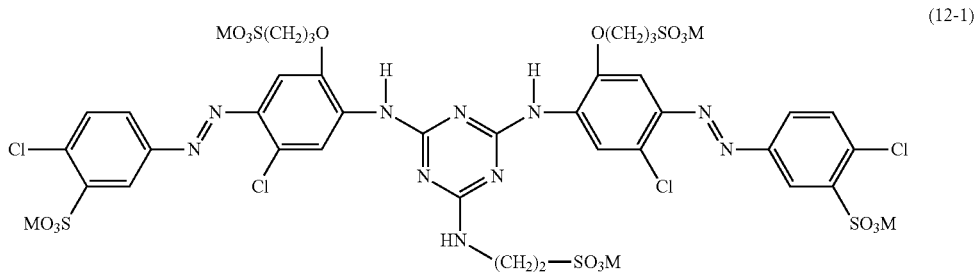

(12-1)

where M is the same as above and is preferably a sodium atom.

5-4-3. Yellow Dye 3

Yellow Dye 3 is a compound represented by the following formula:

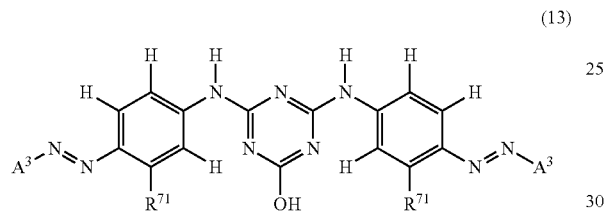

(13)

where $R^{71}$ represents a methoxy group or a methyl group and $A^3$ represents a 1,5-disulfonaphtho-3-yl group or a 1,5,7-trisulfonaphtho-2-yl group.

The compound represented by Formula (13) is not particularly limited and, in particular, is preferably a compound represented by the following formula:

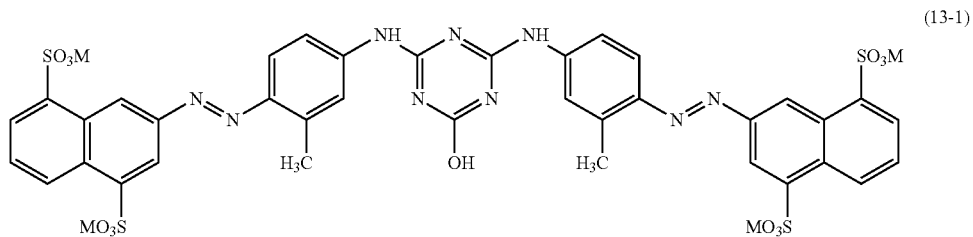

(13-1)

where M represents an alkali metal atom.

Each of the first and second yellow dyes may be a mixture of two or more types of dyes. The first or second yellow dye may be, for example, a mixture of two or more selected from Yellow Dyes 1 to 3.

The first and second yellow dyes are not limited to the above compounds within the scope of the invention. The first and second yellow dyes may contain, for example, at least one selected from the group consisting of C.I. Direct Yellow 12, C.I. Direct Yellow 24, C.I. Direct Yellow 26, C.I. Direct Yellow 27, C.I. Direct Yellow 28, C.I. Direct Yellow 33, C.I. Direct Yellow 39, C.I. Direct Yellow 58, C.I. Direct Yellow 86, C.I. Direct Yellow 98, C.I. Direct Yellow 100, C.I. Direct Yellow 132, C.I. Direct Yellow 142, C.I. Direct Yellow 169, C.I. Acid Yellow 3, C.I. Acid Yellow 11, C.I. Acid Yellow 17, C.I. Acid Yellow 19, C.I. Acid Yellow 23, C.I. Acid Yellow 25, C.I. Acid Yellow 29, C.I. Acid Yellow 38, C.I. Acid Yellow 42, C.I. Acid Yellow 49, C.I. Acid Yellow 59, C.I. Acid Yellow 61, C.I. Acid Yellow 71, C.I. Acid Yellow 72, C.I. Basic Yellow 40, and C.I. Reactive Yellow 2.

5-5. Black Dye

In this embodiment, the gray ink may contain the black dye. The black dye is not particularly limited. For example, Black Dyes 1 to 5 below can be used as the black dye.

5-5-1. Black Dye 1

Black Dye 1 is a compound represented by the following formula:

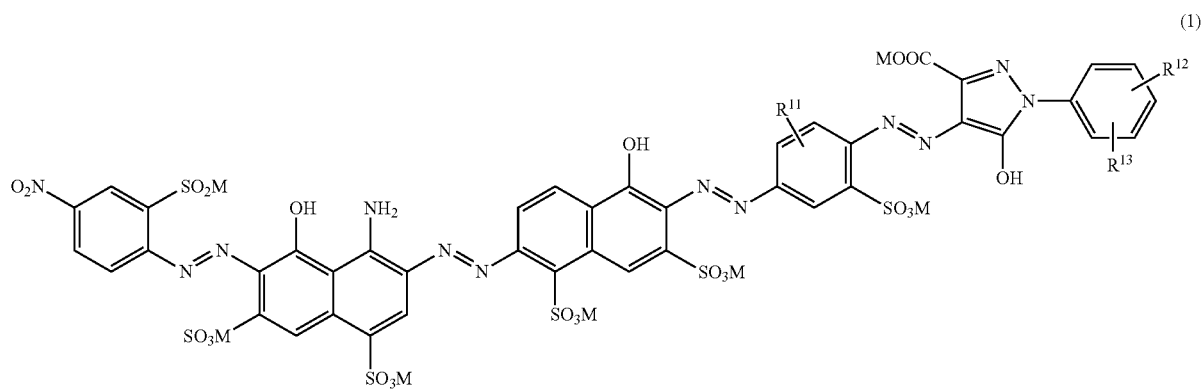

(1)

where $R^{11}$ represents a halogen atom, a hydrogen atom, an $SO_3M$ group, or a COOM group; $R^{12}$ and $R^{13}$ independently represent a hydrogen atom, an $SO_3M$ group, or a COOM group, provided that $R^{12}$ and $R^{13}$ do not simultaneously represent a hydrogen atom; and M represents a hydrogen atom, an alkali metal atom, or an ammonium group.

The compound represented by Formula (1) is not particularly limited and, in particular, is preferably a compound represented by the following formula:

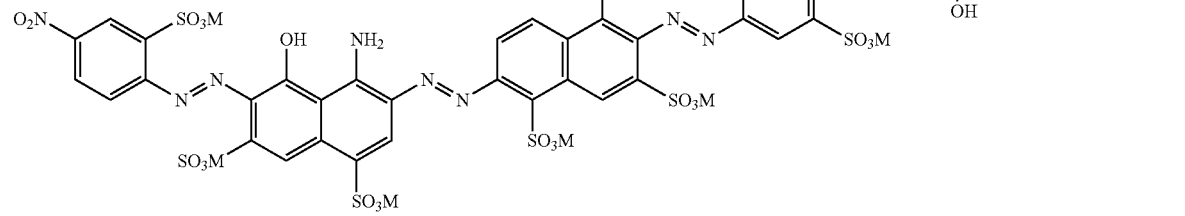

(1-1)

where M is the same as above.

5-5-2. Black Dye 2

Black Dye 2 is a compound represented by the following formula:

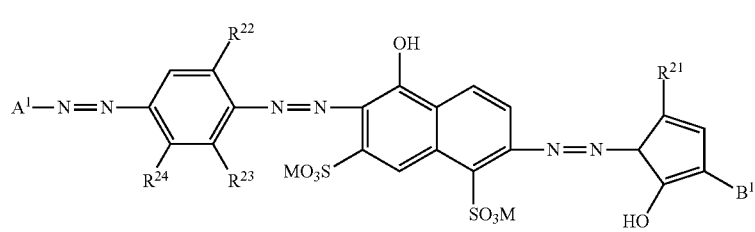

(2)

where $R^{21}$ represents a carboxy group, a (C1-C8 alkoxy)carbonyl group, a C1-C4 alkyl group which may be substituted with a (C1-C8 alkoxy)carbonyl group or a carboxy group, or a phenyl group which may be substituted with a hydroxy group, a sulfo group, or a carboxy group; $R^{22}$, $R^{23}$, and $R^{24}$ independently represent a hydrogen atom, a chlorine atom, a hydroxy group, a sulfo group, a carboxy group, a sulfamoyl group, a carbamoyl group, a C1-C4 alkyl group, a C1-C4 alkoxy group which may be substituted with a hydroxy group, a C1-C4 alkoxy group, a hydroxy(C1-C4 alkoxy) group, a sulfo group, or a carboxy group, a mono or di(C1-C4 alkyl)amino group which may be substituted with a hydroxy group, a sulfo group, or a carboxy group, a (C1-C4 alkyl)carbonylamino group which may be substituted with a hydroxy group or a carboxy group, an N'—(C1-C4 alkyl)ureido group which may be substituted with a hydroxy group, a sulfo group, or a carboxy group, a phenylamino group containing a benzene ring which may be substituted with a chlorine atom, a C1-C4 alkyl group, a nitro group, a sulfo group, or a carboxy group, a benzoylamino group containing a benzene ring which may be substituted with a chlorine atom, a C1-C4 alkyl group, a nitro group, a sulfo group, or a carboxy group, or a phenylsulfonylamino group containing a benzene ring which may be substituted with a chlorine atom, a C1-C4 alkyl group, a nitro group, a sulfo group, or a carboxy group; $B^1$ represents a phenyl group which may be substituted, a naphthyl group which may be substituted, a substituted phenyl group containing a substituent that is selected from the group consisting of a hydroxy group, a sulfo group, a carboxy group, a C1-C4 alkyl group, a C1-C4 alkoxy group, an amino group, a mono or di(C1-C4 alkyl)amino group, an acetylamino group, and a benzoylamino group containing a benzene ring which may be substituted with a chlorine atom, a C1-C4 alkyl group, a nitro group, a sulfo group, or a carboxy group, or a substituted naphthyl group containing a substituent that is selected from the group consisting of a hydroxy group, a sulfo group, a C1-C4 alkoxy group, and a phenylsulfonyloxy group containing a benzene ring which may be substituted with a methyl group, a nitro group, or a chlorine atom; M represents a hydrogen atom, an alkali metal atom, or an ammonium group; and $A^1$ represents a substituted monovalent heterocyclic group represented by the following formula (21) or (22):

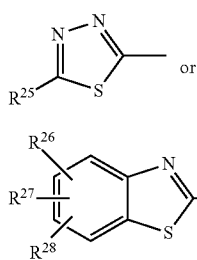

where $R^{25}$ represents a mercapto group or a (C1-C4 alkyl) thio group which may be substituted with a hydroxy group, a C1-C4 alkoxy group, a hydroxy(C1-C4 alkoxy) group, a sulfo group, or a carboxy group and $R^{26}$, $R^{27}$, and $R^{28}$ independently represent a hydrogen atom, a chlorine atom, a carboxy group, a sulfo group, a nitro group, a hydroxy group, a carbamoyl group, a sulfamoyl group, a C1-C4 alkyl group, a C1-C4 alkoxy group which may be substituted with a hydroxy group, a C1-C4 alkoxy group, a sulfo group, or a carboxy group, a (C1-C4 alkyl)sulfonyl group which may be substituted with a hydroxy group, a sulfo group, or a carboxy group, or a phenylsulfonyl group containing a benzene ring which may be substituted with a chlorine atom, a C1-C4 alkyl group, a nitro group, a sulfo group, or a carboxy group.

The compound represented by Formula (2) is not particularly limited and, in particular, is preferably a compound represented by the following formula:

where M is the same as above and is preferably a lithium atom.

5-5-3. Black Dye 3

Black Dye 3 is a compound represented by the following formula:

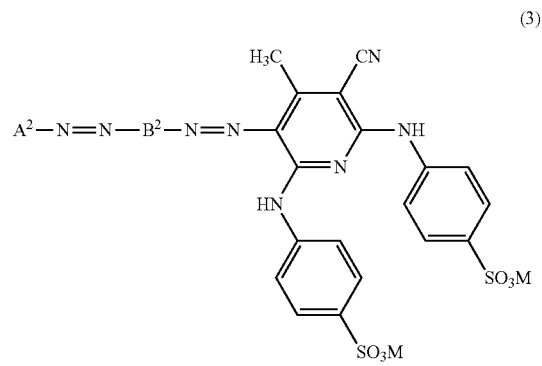

where M represents a hydrogen atom, an alkali metal atom, or an ammonium group; $A^2$ represents a substituent represented by the following formula (31) or (32); and $B^2$ represents a substituent represented by the following formula (33) or (34):

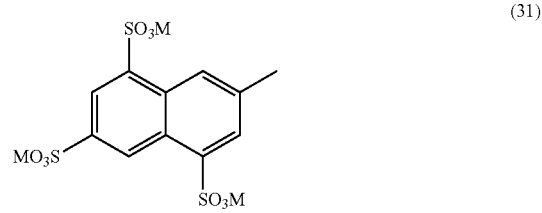

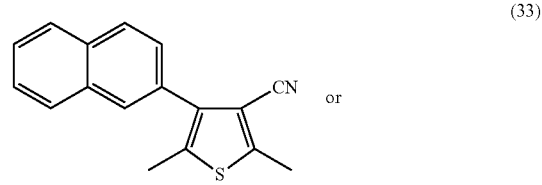

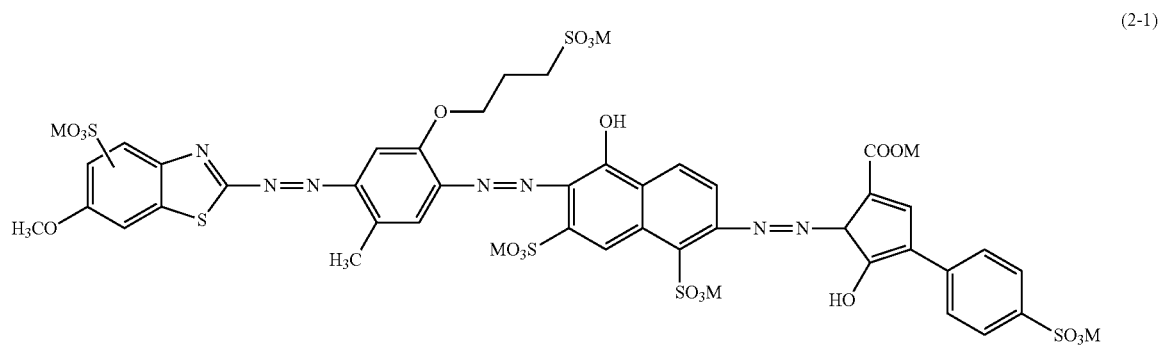

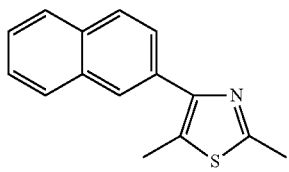
(34)

where M represents a hydrogen atom, an alkali metal atom, or an ammonium group.

The compound represented by Formula (3) is not particularly limited and, in particular, is preferably a compound represented by the following formula:

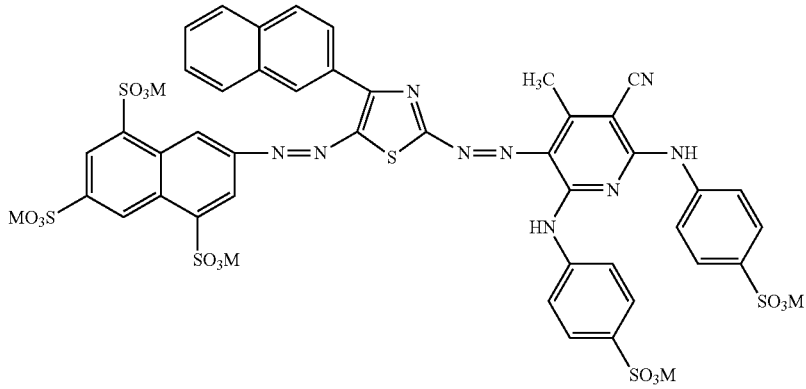
(3-1)

where M is the same as above and is preferably a lithium atom.

5-5-4. Black Dye 4

Black Dye 4 is a compound represented by the following formula:

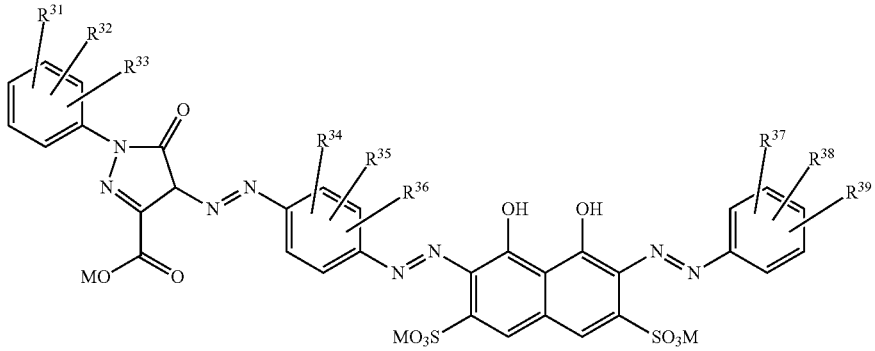
(4)

where $R^{31}$, $R^{32}$, $R^{33}$, $R^{34}$, $R^{35}$, $R^{36}$, $R^{37}$, $R^{38}$, and $R^{39}$ independently represent one selected from the group consisting of a hydrogen atom, a hydroxy group, an $SO_3M$ group, a $PO_3M_2$ group, a COOM group, a nitro group, and an amino group and M represents a hydrogen atom, an alkali metal atom, or an ammonium group.

The compound represented by Formula (4) is not particularly limited and, in particular, is preferably a compound represented by the following formula:

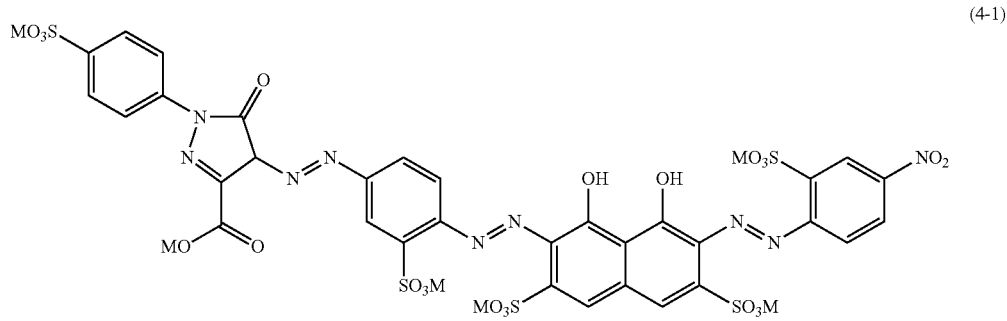

(4-1)

where M is the same as above and is preferably a lithium atom.

5-5-5. Black Dye 5

Black Dye 5 is a compound represented by the following formula:

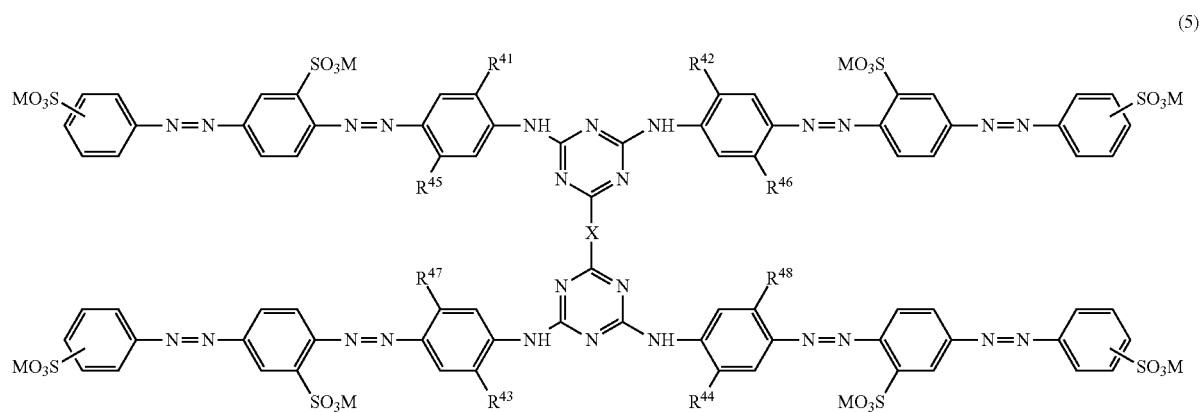

(5)

where $R^{41}$, $R^{42}$, $R^{43}$, $R^{44}$, $R^{45}$, $R^{46}$, $R^{47}$, and $R^{48}$ independently represent a hydrogen atom, a halogen atom, a C1-C4 alkyl group, a C1-C4 alkoxy group, a C1-C4 alkoxy group substituted with a sulfo group or a carboxy group, or a (C1-C4 alkyl)carbonylamino group, preferably represent a hydrogen atom, a chlorine atom, a methyl group, an ethyl group, a t-butyl group, a 2-carboxyethoxy group, a 3-carboxypropoxy group, a 2-sulfoethoxy group, a 3-sulfopropoxy group, or a 4-sulfobutoxy group, and more preferably represent a hydrogen atom, a methyl group, or a 3-sulfopropoxy group; X represents a divalent crosslinking group; and M represents a hydrogen atom, an alkali metal atom, or an ammonium group. The divalent crosslinking group is not particularly limited. The divalent crosslinking group is preferably, for example, a (C1-C8 alkylene)diamino group, a phenylenediamino group, a piperazine-1,4-diyl group, or a piperazine-1,4-diyl group substituted with a C1-C4 alkyl group or C1-C4 alkoxy group and more preferably a piperazine-1,4-diyl group.

The compound represented by Formula (5) is not particularly limited and, in particular, is preferably a compound represented by the following formula:

(5-1)

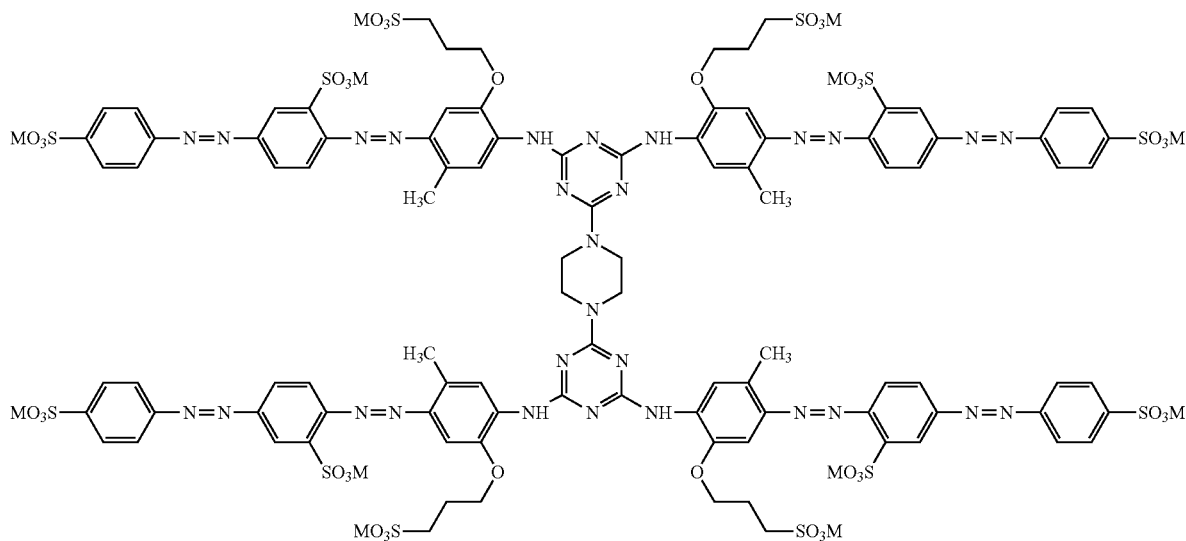

where M is the same as above and preferably represents a lithium atom.

The black dye may be may be a mixture of two or more types of dyes. The black dye may be, for example, a mixture of two or more selected from Black Dyes 1 to 5.

The black dye is not limited to the above compounds within the scope of the invention. The black dye may contain at least one selected from the group consisting of C.I. Acid Black 1, C.I. Acid Black 2, C.I. Acid Black 24, C.I. Acid Black 94, C.I. Food Black 1, C.I. Food Black 2, C.I. Direct Black 19, C.I. Direct Black 38, C.I. Direct Black 51, C.I. Direct Black 71, C.I. Direct Black 154, C.I. Direct Black 168, C.I. Direct Black 171, C.I. Direct Black 195, C.I. Reactive Black 3, C.I. Reactive Black 4, and C.I. Reactive Black 35.

6. Other Components

Each ink used in this embodiment may further contain water, a humectant, a penetrant, a pH adjustor, an antiseptic/fungicidal agent, a rust preventive, and a chelating agent. When containing at least one of these components, the ink used in this embodiment has increased properties in some cases.

Water

Water used is not particularly limited. Examples of water used include pure water products such as ion-exchanged water, ultrafiltered water, reverse osmosis-purified water, and distilled water and ultrapure water substantially free from ionic impurities. The use of water sterilized by ultraviolet irradiation or the addition of hydrogen peroxide tends to allow the proliferation of mold and/or bacteria to be prevented in the case of storing the ink used herein for a long period.

Humectant

The use of the humectant allows the drying of a tip portion of an ink-jet head to be prevented. Examples of the humectant include, but are not limited to, lower alcohols such as methyl alcohol, ethyl alcohol, n-propyl alcohol, isopropyl alcohol, n-butyl alcohol, sec-butyl alcohol, and t-butyl alcohol; amides such as dimethylformamide and dimethylacetamide; ketones such as acetone; ketoalcohols such as diacetone alcohol; ethers such as tetrahydrofuran and dioxane; polyalkylene glycols such as polyethylene glycol and polypropylene glycol; 6 alkylene glycols such as ethylene glycol, propylene glycol, butylene glycol, diethylene glycol, triethylene glycol, dipropylene glycol, tripropylene glycol, thiodiglycol, and hexylene glycol; glycerin; 2-pyrrolidone; N-methyl-2-pyrrolidone; and 1,3-dimethyl-imidazolidinone. These compounds may be used alone or in combination.

The content of the humectant in each ink is preferably 0% to 95% by mass, more preferably 5% to 80% by mass, and further more preferably 5% to 50% by mass.

Penetrant

The use of the humectant allows the drying of paper to be accelerated. Examples of the penetrant include, but are not limited to, glycol ethers such as ethylene glycol methyl ether, ethylene glycol ethyl ether, ethylene glycol propyl ether, diethylene glycol methyl ether, diethylene glycol ethyl ether, diethylene glycol propyl ether, diethylene glycol butyl ether, triethylene glycol methyl ether, triethylene glycol ethyl ether, triethylene glycol propyl ether, triethylene glycol butyl ether, propylene glycol methyl ether, propylene glycol ethyl ether, propylene glycol propyl ether, propylene glycol butyl ether, dipropylene glycol methyl ether, dipropylene glycol ethyl ether, dipropylene glycol propyl ether, dipropylene glycol butyl ether, tripropylene glycol methyl ether, tripropylene glycol ethyl ether, tripropylene glycol propyl ether, and tripropylene glycol butyl ether. These ethers may be used alone or in combination.

The content of the penetrant in each ink is preferably 0% to 20% by mass, more preferably 0.1% to 15% by mass, and further more preferably 1% to 10% by mass.

pH Adjustor

Examples of the pH adjustor include, but are not limited to, potassium dihydrogen phosphate, disodium hydrogen phosphate, sodium hydroxide, lithium hydroxide, potassium hydroxide, ammonia, diethanolamine, triethanolamine, triisopropanolamine, potassium carbonate, sodium carbonate, and sodium hydrogen carbonate. These compounds may be used alone or in combination.

Antiseptic/Fungicidal Agent

Examples of the antiseptic/fungicidal agent include, but are not limited to, sodium benzoate; sodium pentachlorophenolate; sodium 2-pyridinethiol-1-oxide; sodium sorbate; sodium dehydroacetate; 1,2-dibenzothiazoline-3-on; commercially available products, such as Proxel™ XL-2 and Proxel™ GXL, available from Avecia K.K.; and commercially available products, such as Denicide™ CSA and Denicide™ NS-500W, available from Nagase ChemteX Corporation. These compounds may be used alone or in combination.

Rust Preventive

The rust preventive is not particularly limited and may be, for example, benzotriazole or the like.

Chelating Agent

Examples of the carboxylic acid include, but are not limited to, ethylenediaminetetraacetic acid, salts of ethylenediaminetetraacetic acid (dihydrogen disodium ethylenediaminetetraacetate and the like), iminodisuccinic acid, and salts of iminodisuccinate.

Method for Preparing Each Ink

Each ink can be prepared in such a way that a corresponding one or more of the dyes and the other components are uniformly mixed and insoluble matter is removed with a filter. A Method for preparing each ink is not particularly limited and may be a known method.

Ink Jet Recording Method

In an ink-jet recording method using the ink-jet ink set according to the invention, the black ink, the cyan ink, the magenta ink, the yellow ink, and the gray ink are applied to a recording medium. The application of each ink is not particularly limited and may be performed using an ink-jet recording apparatus usually used.

In the case of recording an achromatic image using the ink-jet ink set according to the invention, the gray ink is used. An achromatic image may be recorded by mixing the cyan ink, the magenta ink, and the yellow ink. For example, an achromatic image is recorded using the gray ink and an achromatic image is recorded using the cyan ink, the magenta ink, and the yellow ink at the same time. This enables the recording speed to be increased.

EXAMPLES

The invention is further described below in detail with reference to examples and comparative examples. The invention is not limited to the examples.

1. Materials for Ink Compositions

Materials for ink compositions used in the examples, the comparative examples, or reference examples are as described below.

Carbon Black

CB1: A self-dispersible carbon black dispersion was used (details are described below).

Cyan Dyes, Magenta Dyes, Yellow Dyes, and Black Dyes

C1: A compound which is represented by Formula (7-1) and in which 1.20 of Rings A to D below are pyridine rings condensed in positions 2 and 3 and 2.80 of Rings A to D are benzene rings was used (details are described below).

C2: Compound F shown in Table 1 was used.

C3: C.I. Direct Blue 199 was used.

M1: A mixture of a compound represented by Formula (10-1) in which M is a sodium atom and a compound represented by Formula (10-1) in which M is an ammonium group was used.

M2: A compound represented by Formula (8-2) was used.

M3: A compound represented by the following formula was used:

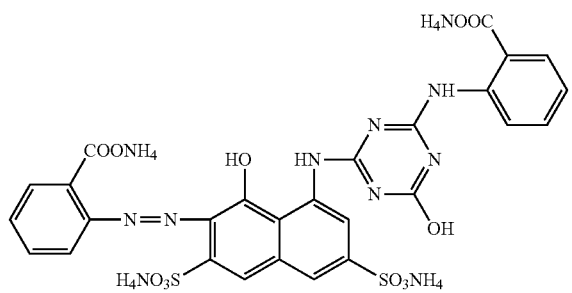

Y1: A compound represented by Formula (12-1) in which M is a sodium atom was used.

Y2: A compound represented by Formula (11-1) in which M is a potassium atom was used.

Y3: C.I. Direct Yellow 173 was used.

K1: A mixture prepared by mixing a compound represented by Formula (1-1) in which M is a lithium atom and a compound represented by Formula (1-1) in which M is a sodium atom at a ratio of 8:2 was used.

K2: A compound represented by Formula (2-1) in which M is a lithium atom was used.

K3: A compound represented by Formula (5-1) in which M is a lithium atom was used.

K4: A compound represented by Formula (3-1) in which M is a lithium atom was used.

K5: A compound represented by the following formula was used:

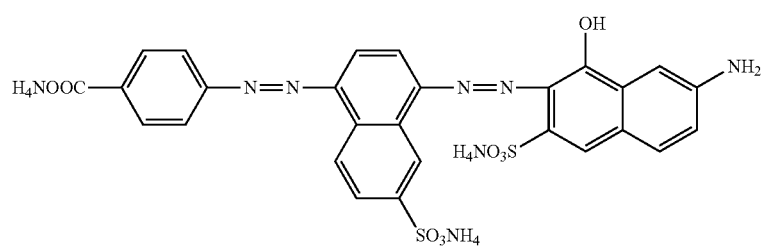

K6: C.I. Direct Black 195 was used.
K7: C.I. Direct Yellow 132 was used.
Humectants
  Propylene glycol
  Triethylene glycol
  Glycerin
Penetrant
  Triethylene glycol monobutyl ether
pH Adjustor
  Triethanolamine
Preparation of Self-dispersible Carbon Black Dispersion Twenty grams of carbon black, 5170, commercially available from Degussa AG was mixed with 500 g of water and was then dispersed therein for 5 minutes using a household mixer. An obtained liquid was poured into a 3 L glass vessel equipped with a stirrer. An ozone-containing gas with an ozone concentration of 8% by mass was introduced into the liquid at a rate of 500 mL/minute with the liquid stirred with the stirrer. In this operation, ozone was generated using an electrolytic ozonizer available from Permelec Electrode Ltd. An obtained crude dispersion was filtered through glass fiber filter paper, GA-100, available from Advantec Toyo Kaisha, Ltd. A 0.1 N potassium hydroxide solution was added to the filtrate such that the concentration of a pigment in the filtrate was 20% by mass. The diluted filtrate was concentrated while being adjusted to a pH of 9, whereby the self-dispersible carbon black dispersion was prepared.

Preparation of Resin Emulsion

Into a reaction vessel equipped with a stirrer, a reflux condenser, a dropping funnel, and a thermometer, 900 g of ion-exchanged water and 1 g of sodium laurylsulfate were charged, followed by heating to 70° C. and nitrogen substitution under stirring. The temperature in the reaction vessel was maintained at 70° C., 4 g of potassium persulfate, which was used as a polymerization initiator, was added to the reaction vessel and was dissolved, whereby a reaction solution was obtained. An emulsion was prepared in such a way that 20 g of acrylamide, 365 g of styrene, 545 g of butyl acrylate, and 30 g of methacrylic acid were added to 450 g of ion-exchanged water and 3 g of sodium laurylsulfate under stirring. The emulsion was added dropwise to the reaction solution over 4 hours, followed by ageing for 3 hours, whereby a resin emulsion was obtained. After the resin emulsion was cooled to room temperature, ion-exchanged water and an aqueous solution of sodium hydroxide were added to the resin emulsion, whereby an aqueous emulsion having a solid content of 40% by mass and a pH of 8 was prepared. The glass transition temperature of resin in the aqueous emulsion was −6° C.

Preparation of Cyan Dye C1
Step 1

The synthesis of a compound which is represented by a formula below and in which 1.20 of Rings A to D below are pyridine rings condensed in positions 2 and 3 and 2.80 of Rings A to D are benzene rings is exemplified below.

To 375 parts of sulfolane, 31.11 parts of phthalic anhydride, 15.04 parts of quinolinic acid, 108 parts of urea, 10.1 parts of copper (II) chloride, and 1.5 parts of ammonium molybdate were added, followed by heating to 200° C. and reaction at 200° C. for 5 hours. After the reaction was finished, the reaction mixture was cooled to 65° C., 50 parts of N,N-dimethylformamide (DMF) was added to the reaction mixture, and a precipitated solid was separated by filtration. The obtained solid was washed with 50 parts of DMF, whereby 75.1 parts of Wet Cake A was obtained. Obtained Wet Cake A was added to 450 parts of DMF, followed by heating to 110° C. and reaction at 110° C. for 1 hour. A precipitated solid was separated by filtration and was then washed with 200 parts of water, whereby Wet Cake B was obtained. Obtained Wet Cake B was added to 450 parts of 5% hydrochloric acid, followed by heating to 60° C. and reaction at 60° C. for 1 hour. A precipitated solid was separated by filtration and was then washed with 200 parts of water, whereby Wet Cake C was obtained. Obtained Wet Cake C was added to 450 parts of 5% ammonia water, followed by stirring for 1 hour. A precipitated solid was separated by filtration and was then washed with 200 parts of water, whereby 78.6 parts of Wet Cake D was obtained. Obtained Wet Cake D was dried at 80° C., whereby 24.9 parts of a target compound was obtained in the form of a blue solid.

To 46.2 parts of chlorosulfonic acid, 5.8 parts of the target compound was gradually added at room temperature so as not to exceed 60° C., followed by reaction at 140° C. for 4 hours. An obtained reaction solution was cooled to 70° C. To the cooled reaction solution, 17.9 parts of thionyl chloride was added dropwise over 30 minutes, followed by reaction at 70° C. for 3 hours, whereby a reaction solution was obtained. The reaction solution was cooled to 30° C. or lower and was slowly poured into 800 parts of ice water, whereby a solid was precipitated. The precipitated solid was separated by filtration and was then washed with 200 parts of cool water, whereby 38.2 parts of Wet Cake E containing a compound represented by the following formula was obtained:

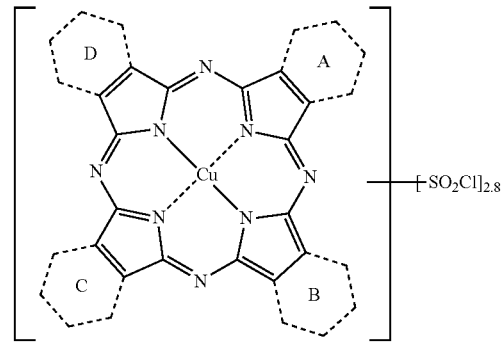

(7-1a)

where A to D are the same as above.

Step 2

Synthesis of porphyrazine compound represented by above formula (Colorant C in which 1.20 of Rings A to D are pyridine rings condensed in positions 2 and 3 and 2.80 of Rings A to D are benzene rings)

To 200 parts of ice water, 38.2 parts of Wet Cake E obtained in Step 1 was added, followed by stirring at 5° C. or lower, whereby a suspension was prepared. After 10 minutes, a solution prepared by dissolving 3.7 parts of an organic amine represented by the following formula in a mixture of 1.5 parts of 28% ammonia water and 40 parts of water was added to the suspension with the suspension maintained at 10° C. or lower, followed by reaction with a pH of 9.0 maintained with 28% ammonia water, heating to 20° C. with a pH of 9.0 maintained, and further reaction at a pH of 9.0 overnight:

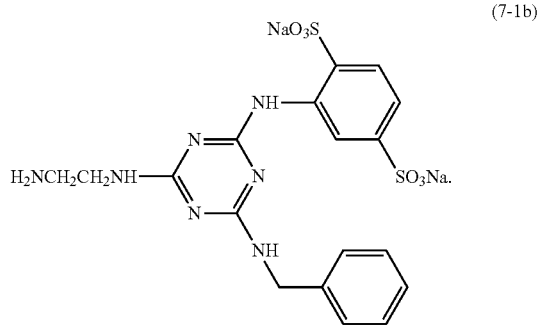

(7-1b)

The amount of a reaction solution obtained in this operation was 300 parts. After the reaction solution was heated to 50° C., was mixed with 60 parts of sodium chloride, and was then stirred for 30 minutes, the resulting reaction solution was adjusted to a pH of 5.0 with concentrated hydrochloric acid, whereby a solid was precipitated. The precipitated solid was separated by filtration and was then washed with 100 parts of a 20% aqueous solution of sodium chloride, whereby 24.2 parts of Wet Cake F was obtained. Obtained Wet Cake F was added to 200 parts of water, followed by adjustment to a pH of 9.0 with a 25% aqueous solution of sodium hydroxide, whereby a solution was obtained. The amount of this solution was 250 parts. After this solution was heated to 50° C., was mixed with 50 parts of sodium chloride, and was then stirred for 30 minutes, this resulting solution was adjusted to a pH of 4.0 with concentrated hydrochloric acid, whereby a solid was precipitated. The precipitated solid was separated by filtration and was then washed with 100 parts of a 20% aqueous solution of sodium chloride, whereby 22.3 parts of Wet Cake G was obtained.

Obtained Wet Cake G was added to a mixture of 160 parts of isopropyl alcohol and 40 parts of water, followed by stirring at 50° C. for 1 hour, whereby a solid was precipitated. The precipitated solid was separated by filtration, whereby 14.4 parts of Wet Cake H was obtained. Obtained Wet Cake H was dried, whereby 10.8 parts of the free acid of the porphyrazine compound represented by Formula (7-1a) was obtained in the form of a blue powder (C1). The maximum absorption wavelength λmax of the blue powder (C1) was 602 nm as determined by absorptiometry.

2. Preparation of Inks

A black ink (Bk-1), cyan inks (C-1 to C-3), magenta inks (M-1 to M-3), yellow inks (Y-1 to Y-3), and gray inks (Gy-1 to Gy-14) containing materials and having a composition shown in Tables 2 to 4 were prepared. In particular, each ink was prepared in such a way that the materials were uniformly mixed and insoluble matter was removed with a filter. Incidentally, in Tables 2 to 4, all values are on a mass percent basis and the total is 100.0% by mass.

TABLE 2

|  | Bk-1 |
|---|---|
| Black dye dispersion | 35.0 |
| Glycerin | 8.0 |
| Triethylene glycol | 5.0 |
| Triethylene glycol monobutyl ether | 15.0 |
| Olfine E1010 | 0.5 |
| Surfynol 104 | 0.5 |
| 1,2-Hexanediol | 5.0 |
| Trimethylolpropane | 3.0 |
| Triethanolamine | 1.0 |
| Resin emulsion | 3.0 |
| Water | Balance |
| Total (mass percent) | 100 |

TABLE 3

|  | C-1 | C-2 | C-3 | M-1 | M-2 | M-3 | Y-1 | Y-2 | Y-3 |
|---|---|---|---|---|---|---|---|---|---|
| Dye (Y1) |  |  |  |  |  |  |  | 5.0 | 2.5 |
| Dye (Y2) |  |  |  |  |  |  | 5.0 |  | 2.5 |
| Dye (M1) |  |  |  |  | 7.0 | 5.5 |  |  |  |
| Dye (M2) |  |  |  | 5.0 |  | 0.5 |  |  |  |
| Dye (C1) | 4.0 |  | 2.0 |  |  |  |  |  |  |
| Dye (C2) |  | 4.0 | 2.0 |  |  |  |  |  |  |
| Glycerin | 10 | 10 | 10 | 10 | 10 | 10 | 7 | 7 | 7 |
| Triethylene glycol | 4 | 4 | 4 | 2 | 2 | 2 | 11 | 11 | 11 |
| Triethylene glycol monobutyl ether | 5 | 5 | 5 | 10 | 10 | 10 | 6 | 6 | 6 |
| Olfine E1010 | 0.3 | 0.3 | 0.3 | 0.3 | 0.3 | 0.3 |  |  |  |
| Surfynol 104 PG50 | 0.3 | 0.3 | 0.3 | 0.3 | 0.3 | 0.3 | 0.3 | 0.3 | 0.3 |
| 2-Pyrrolidone | 3 | 3 | 3 | 3 | 3 | 3 | 1 | 1 | 1 |
| Urea |  |  |  | 5 | 5 | 5 | 4 | 4 | 4 |
| Triethanolamine | 0.1 | 0.1 | 0.1 | 0.1 | 0.1 | 0.1 | 0.1 | 0.1 | 0.1 |
| Lithium hydroxide monohydrate | 1.0 | 1.0 | 1.0 |  |  |  |  |  |  |
| 2-Naphthoic acid | 4.0 | 4.0 | 4.0 |  |  |  |  |  |  |
| Water | Balance | Balance | Balance | Balance | Balance | Balance | Balance | Balance | Balance |
| Total (mass percent) | 100 | 100 | 100 | 100 | 100 | 100 | 100 | 100 | 100 |

TABLE 4

| | Gy-1 | Gy-2 | Gy-3 | Gy-4 | Gy-5 | Gy-6 | Gy-7 | Gy-8 | Gy-9 | Gy-10 | Gy-11 | Gy-12 | Gy-13 | Gy-14 |
|---|---|---|---|---|---|---|---|---|---|---|---|---|---|---|
| Dye (Y1) | 0.67 | 0.64 | 0.63 | 0.60 | 0.57 | 0.53 | 0.47 | | | | | | | 0.60 |
| Dye (Y2) | 0.83 | 0.80 | 0.79 | 0.75 | 0.71 | 0.67 | 0.58 | 1.58 | 1.50 | 1.42 | | | | 0.75 |
| Dye (Y3) | | | | | | | | | | | | | 1.20 | |
| Dye (M1) | 1.67 | 1.60 | 1.58 | 1.50 | 1.42 | 1.33 | 1.17 | 1.58 | 1.50 | 1.42 | | | | 1.50 |
| Dye (M2) | 0.33 | 0.32 | 0.32 | 0.30 | 0.28 | 0.27 | 0.23 | 0.32 | 0.30 | 0.28 | | | | 0.30 |
| Dye (M3) | | | | | | | | | | | | | 0.75 | |
| Dye (C1) | 0.67 | 0.64 | 0.63 | 0.60 | 0.57 | 0.53 | 0.47 | | | | | | | 0.60 |
| Dye (C2) | 0.83 | 0.80 | 0.79 | 0.75 | 0.71 | 0.67 | 0.58 | 1.43 | 1.35 | 1.28 | | | | 0.75 |
| Dye (C3) | | | | | | | | | | | | | 1.05 | |
| Dye (K1) | | 0.08 | 0.10 | 0.20 | 0.30 | 0.40 | 0.60 | 0.15 | 0.30 | 0.45 | 2.00 | 1.00 | 0.20 | |
| Dye (K2) | | 0.08 | 0.10 | 0.20 | 0.30 | 0.40 | 0.60 | | | | 2.00 | 1.00 | 0.20 | |
| Dye (K3) | | 0.04 | 0.05 | 0.10 | 0.15 | 0.20 | 0.30 | | | | 1.00 | 0.50 | 0.10 | |
| Dye (K4) | | | | | | | | 0.15 | 0.30 | 0.45 | | | | |
| Dye (K5) | | | | | | | | | | | | | | 0.40 |
| Dye (K6) | | | | | | | | | | | | | | 0.20 |
| Dye (K7) | | | | | | | | | | | | | | 0.20 |
| Glycerin | 10 | 10 | 10 | 10 | 10 | 10 | 10 | 10 | 10 | 10 | 10 | 10 | 10 | 10 |
| Triethylene glycol | 10 | 10 | 10 | 10 | 10 | 10 | 10 | 10 | 10 | 10 | 10 | 10 | 10 | 10 |
| Triethylene glycol monobutyl ether | 8 | 8 | 8 | 8 | 8 | 8 | 8 | 8 | 8 | 8 | 8 | 8 | 8 | 8 |
| Olfine E1010 | 0.3 | 0.3 | 0.3 | 0.3 | 0.3 | 0.3 | 0.3 | 0.3 | 0.3 | 0.3 | 0.3 | 0.3 | 0.3 | 0.3 |
| Surfynol 104 PG50 | 0.3 | 0.3 | 0.3 | 0.3 | 0.3 | 0.3 | 0.3 | 0.3 | 0.3 | 0.3 | 0.3 | 0.3 | 0.3 | 0.3 |
| Triethanolamine | 0.5 | 0.5 | 0.5 | 0.5 | 0.5 | 0.5 | 0.5 | 0.5 | 0.5 | 0.5 | 0.5 | 0.5 | 0.5 | 0.5 |
| Water | Balance | Balance | Balance | Balance | Balance | Balance | Balance | Balance | Balance | Balance | Balance | Balance | Balance | Balance |
| Total (mass percent) | 100 | 100 | 100 | 100 | 100 | 100 | 100 | 100 | 100 | 100 | 100 | 100 | 100 | 100 |
| Content $C_B$ of black dye (mass percent) | 0.00 | 0.20 | 0.25 | 0.50 | 0.75 | 1.00 | 1.50 | 0.30 | 0.60 | 0.90 | 5.00 | 2.50 | 0.50 | 0.80 |
| Content $C_C$ of cyan dye (mass percent) | 1.50 | 1.44 | 1.43 | 1.35 | 1.28 | 1.20 | 1.05 | 1.43 | 1.35 | 1.28 | 0.00 | 0.00 | 1.05 | 1.35 |
| Content $C_M$ of magenta dye (mass percent) | 2.00 | 1.92 | 1.90 | 1.80 | 1.70 | 1.60 | 1.40 | 1.90 | 1.80 | 1.70 | 0.00 | 0.00 | 0.75 | 1.80 |
| Content $C_Y$ of yellow dye (mass percent) | 1.50 | 1.44 | 1.43 | 1.35 | 1.28 | 1.20 | 1.05 | 1.58 | 1.50 | 1.42 | 0.00 | 0.00 | 1.20 | 1.35 |

TABLE 5

| | Bk Ink | C Ink | C ROD | M Ink | M ROD | Y Ink | Y ROD | Gy Ink | ROD (as gray ink) | ROD (as cyan dye component) | ROD (as magenta dye component) | ROD (as yellow dye component) | ROD (as black dye component) |
|---|---|---|---|---|---|---|---|---|---|---|---|---|---|
| Example 1 | Bk-1 | C-1 | 76% | M-1 | 78% | Y-1 | 83% | Gy-1 | 73% | 78% | 76% | 85% | — |
| Example 2 | Bk-1 | C-1 | 76% | M-1 | 78% | Y-1 | 83% | Gy-2 | 71% | 78% | 76% | 85% | 75% |
| Example 3 | Bk-1 | C-1 | 76% | M-1 | 78% | Y-1 | 83% | Gy-3 | 70% | 78% | 76% | 85% | 75% |
| Example 4 | Bk-1 | C-1 | 76% | M-1 | 78% | Y-1 | 83% | Gy-4 | 69% | 78% | 76% | 85% | 75% |
| Example 5 | Bk-1 | C-1 | 76% | M-1 | 78% | Y-1 | 83% | Gy-5 | 68% | 78% | 76% | 85% | 75% |
| Example 6 | Bk-1 | C-1 | 76% | M-1 | 78% | Y-1 | 83% | Gy-6 | 67% | 78% | 76% | 85% | 75% |
| Example 7 | Bk-1 | C-1 | 76% | M-1 | 78% | Y-1 | 83% | Gy-7 | 67% | 78% | 76% | 85% | 75% |
| Example 8 | Bk-1 | C-1 | 76% | M-1 | 78% | Y-1 | 83% | Gy-8 | 80% | 80% | 78% | 88% | 75% |
| Example 9 | Bk-1 | C-1 | 76% | M-1 | 78% | Y-1 | 83% | Gy-9 | 75% | 80% | 78% | 88% | 75% |
| Example 10 | Bk-1 | C-1 | 76% | M-1 | 78% | Y-1 | 83% | Gy-10 | 74% | 80% | 78% | 88% | 75% |
| Example 11 | Bk-1 | C-2 | 80% | M-2 | 75% | Y-2 | 88% | Gy-4 | 69% | 78% | 76% | 85% | 75% |
| Example 12 | Bk-1 | C-3 | 78% | M-3 | 76% | Y-3 | 85% | Gy-4 | 69% | 78% | 76% | 85% | 75% |
| Comparative Example 1 | Bk-1 | C-1 | 76% | M-1 | 78% | Y-1 | 83% | Not used | — | — | — | — | — |
| Comparative Example 2 | Bk-1 | C-1 | 76% | M-1 | 78% | Y-1 | 83% | Gy-11 | 75% | — | — | — | 75% |
| Comparative Example 3 | Bk-1 | C-1 | 76% | M-1 | 78% | Y-1 | 83% | Gy-12 | 72% | — | — | — | 72% |
| Comparative Example 4 | Bk-1 | C-1 | 76% | M-1 | 78% | Y-1 | 83% | Gy-13 | <65% | <65% | <65% | <65% | 75% |
| Comparative Example 5 | Bk-1 | C-1 | 76% | M-1 | 78% | Y-1 | 83% | Gy-14 | <65% | 78% | 76% | 85% | <65% |

3. Evaluation

Examples 1 to 12 and Comparative Examples 1 to 5

Evaluation of Ozone Resistance
Ozone Resistance of Ink at a Duty of 100%

For each of color inks and gray inks of ink sets shown in Table 5, a single-color image was printed on an ink-jet recording medium (photo paper "Gloss", KA450PSK, available from Seiko Epson Corporation, having a 60-degree glossiness of 41) at a duty of 100% using an ink-jet printer, EP-803A, available from Seiko Epson Corporation. Likewise, a single-color image was printed using each gray ink which was an aqueous solution containing 5% by mass of a dye.

The OD value ($D_0$) of each obtained print was measured with a reflection densitometer, Spectrolino™, available from Gretag. Thereafter, the print was exposed for 120 hours using an ozone weather meter, OMS-L™, available from Suga Test Instruments Co., Ltd. under the following conditions: a temperature of 23° C., a relative humidity of 50%, and an ozone concentration of 5 ppm. The OD value (D) of the exposed print was measured with the reflection densitometer, Spectrolino™, available from Gretag under the following conditions: no light source filter, a D50 light source, and a viewing angle of 2 degrees. The remaining optical density (ROD) of the print was determined by the following equation:

$$\text{ROD } (\%) = (D/D_0) \times 100.$$

Obtained results are shown in Table 5.
Ozone resistance of ink at a duty of 30%

For each of gray inks of ink sets shown in Table 5, a single-color image was printed on an ink-jet recording medium (photo paper "Gloss", KA450PSK, available from Seiko Epson Corporation, having a 60-degree glossiness of 41) at a duty of 30% using an ink-jet printer, EP-803A, available from Seiko Epson Corporation. However, in Comparative Example 1, Bk-1 was used. Incidentally, the amount of each applied ink was adjusted to a duty of 30%.

The remaining optical density (ROD) was determined in substantially the same way as that described above and was evaluated for ozone resistance in accordance with evaluation standards below. Evaluation results are shown in Table 6.
Evaluation Standards
 Good: a ROD of 70% or more.
 Adequate: a ROD of 65% to less than 70%.
 Poor: a ROD of less than 65%.
Evaluation of Color Developability
Evaluation of Color Developability at a Duty of 100%

For each of gray inks of ink sets of the examples and the comparative examples, a single-color image was printed on an ink-jet recording medium (photo paper "Gloss", KA450PSK, available from Seiko Epson Corporation, having a 60-degree glossiness of 41) at a duty of 30% using an ink-jet printer, EP-803A, available from Seiko Epson Corporation. For printing conditions in this operation, the amount of each applied gray ink was determined to be 10 milligrams per square inch.

Obtained prints were measured for color using a spectrophotometer, i1™, available from Xrite and were evaluated on the basis of the obtained OD (black component) in accordance with evaluation standards below. Evaluation results are shown in Table 6.

Evaluation Standards
 Good: an OD (black component) of 1.60 to less than 2.30.
 Adequate: an OD (black component) of 1.40 to less than 1.60.
 Poor: an OD (black component) of less than 1.40.
Evaluation of Granularity For each of gray inks of ink sets of the examples and the comparative examples, printing was performed on an ink-jet recording medium (photo paper "Gloss", KA450PSK, available from Seiko Epson Corporation, having a 60-degree glossiness of 41) at several duties using an ink-jet printer, EP-803A, available from Seiko Epson Corporation.

Obtained prints were measured for OD value and color, were visually observed, and were evaluated for granularity in accordance with evaluation standards below. Evaluation results are shown in Table 6.
Evaluation Standards
 Good: an image, formed at a duty of 30%, having no roughness.
 Adequate: an image, formed at a duty of 30%, having roughness and an image, formed at a duty of 50%, having no roughness.
 Poor: an image, formed at a duty of 50%, having roughness.

TABLE 6

|  | Ozone resistance | Color developability | Granularity |
| --- | --- | --- | --- |
| Example 1 | Good | Adequate | Good |
| Example 2 | Good | Adequate | Good |
| Example 3 | Good | Good | Good |
| Example 4 | Good | Good | Good |
| Example 5 | Good | Good | Good |
| Example 6 | Adequate | Good | Good |
| Example 7 | Adequate | Good | Adequate |
| Example 8 | Good | Good | Good |
| Example 9 | Good | Good | Good |
| Example 10 | Good | Good | Good |
| Example 11 | Good | Good | Good |
| Example 12 | Good | Good | Good |
| Comparative Example 1 | Good | Good | Poor |
| Comparative Example 2 | Good | Good | Poor |
| Comparative Example 3 | Good | Poor | Good |
| Comparative Example 4 | Poor | Adequate | Good |
| Comparative Example 5 | Poor | Adequate | Good |

The above results show that a record recorded by a ink-jet recording method according to the invention has excellent granularity and ozone resistance. In particular, the results show that an achromatic image having excellent color developability in a high-duty region and excellent ozone resistance and granularity in a low-duty region can be obtained. Incidentally, according to the ink sets of Examples 1 to 12, it is obvious that the ROD of an image including an achromatic region and a color region is 65% or more.

On the other hand, in Comparative Example 1, granularity is poor because no gray ink was used. In the case of a gray ink not containing any cyan dye, any magenta dye, or any yellow dye, it is difficult to satisfy all of ozone resistance, color developability, and granularity even if the concentration of a dye is varied in any way as shown above (Comparative Examples 2 and 3). Furthermore, when the ROD of a gray ink that is defined by Equation (B) is below 65%, the ozone resistance of a low-duty region is poor as shown above.

The entire disclosure of Japanese Patent Application No. 2013-109645, filed May 24, 2013 is expressly incorporated by reference herein.

What is claimed is:

1. An ink-jet ink set comprising:
a black ink containing carbon black;
a cyan ink containing a first cyan dye;
a magenta ink containing a first magenta dye;
a yellow ink containing a first yellow dye; and
a gray ink containing a second cyan dye, a second magenta dye, and a second yellow dye,
wherein the cyan ink, the magenta ink, the yellow ink, and the gray ink have a ROD of 65% or more, the ROD being defined by the following equation (A), and the gray ink has an OD value of 1.40 to less than 2.30, the OD value being defined by the following equation (B):

(ROD)=100×(the OD value of a monochrome image, recorded on a recording medium including a void-type ink-absorbing layer, having a duty of 100%, the monochrome image being left for 120 hours in a 23° C. environment having a relative humidity of 50% and an ozone concentration of 5 ppm)/(the OD value of the crude monochrome image)  (A)

and (the OD value of the gray ink)=(the OD value determined in such a way that 10 milligrams per square inch of the gray ink is applied to a recording medium including a void-type ink-absorbing layer)  (B).

2. The ink-jet ink set according to claim 1, wherein the gray ink further contains a black dye.

3. The ink-jet ink set according to claim 2, wherein in the gray ink, a content $C_B$ of the black dye and a sum of a content $C_C$ of the second cyan dye, a content $C_M$ of the second magenta dye, and a content $C_Y$ of the second yellow dye satisfy the following equation:

$C_B:(C_C+C_M+C_Y)$=0.05:0.95 to 0.20:0.80  (C).

4. The ink-jet ink set according to claim 2, wherein in the gray ink, a content $C_B$ of the black dye and a sum of a content $C_C$ of the second cyan dye, a content $C_M$ of the second magenta dye, and a content $C_Y$ of the second yellow dye satisfy the following equation:

$C_B:(C_C+C_M+C_Y)$=0.05:0.95 to 0.15:0.85  (C).

5. The ink-jet ink set according to claim 2, wherein the ROD of an aqueous solution containing 5% by mass of the second yellow dye, the ROD of an aqueous solution containing 5% by mass of the second cyan dye, and the ROD of an aqueous solution containing 5% by mass of the second magenta dye are higher than the ROD of an aqueous solution containing 5% by mass of the black dye.

6. The ink-jet ink set according to claim 2, wherein the black dye contains at least one selected from the group consisting of a compound represented by the following formula (1), a compound represented by the following formula (2), a compound represented by the following formula (3), a compound represented by the following formula (4), and a compound represented by the following formula (5):

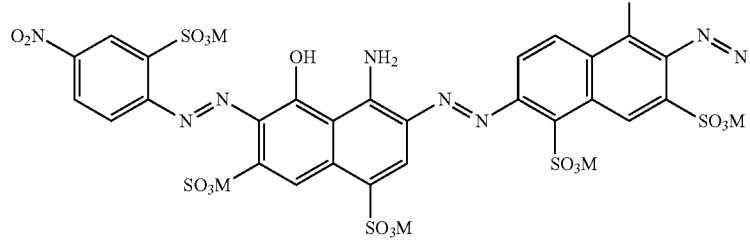

(1)

where $R^{11}$ represents a halogen atom, a hydrogen atom, an $SO_3M$ group, or a COOM group; $R^{12}$ and $R^{13}$ independently represent a hydrogen atom, an $SO_3M$ group, or a COOM group, provided that $R^{12}$ and $R^{13}$ do not simultaneously represent a hydrogen atom; and M represents a hydrogen atom, an alkali metal atom, or an ammonium group,

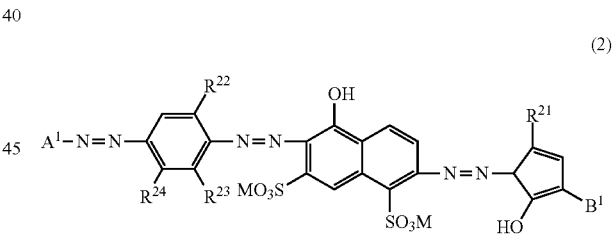

(2)

where $R^{21}$ represents a carboxy group, a (C1-C8 alkoxy)carbonyl group, a C1-C4 alkyl group which may be substituted with a (C1-C8 alkoxy)carbonyl group or a carboxy group, or a phenyl group which may be substituted with a hydroxy group, a sulfo group, or a carboxy group; $R^{22}$, $R^{23}$, and $R^{24}$ independently represent a hydrogen atom, a chlorine atom, a hydroxy group, a sulfo group, a carboxy group, a sulfamoyl group, a carbamoyl group, a C1-C4 alkyl group, a C1-C4 alkoxy group which may be substituted with a hydroxy group, a C1-C4 alkoxy group, a hydroxy(C1-C4 alkoxy) group, a sulfo group, or a carboxy group, a mono or di(C1-C4 alkyl)amino group which may be substituted with a hydroxy group, a sulfo group, or a carboxy group, a (C1-C4 alkyl)carbonylamino group which may be substituted with a hydroxy group or a carboxy group, an N'—(C1-C4 alkyl)ureido group which may be substituted with a hydroxy group, a sulfo group, or a carboxy group, a phenylamino group containing a benzene ring which may be substituted with a chlorine atom, a C1-C4 alkyl group, a nitro group, a sulfo group, or a carboxy group, a benzoylamino group containing a benzene ring which may be substituted with a chlorine atom, a C1-C4 alkyl group, a nitro group, a sulfo group, or a carboxy group, or a phenylsulfonylamino group containing a benzene ring which may be substituted with a chlorine atom, a C1-C4 alkyl group, a nitro group, a sulfo group, or a carboxy group; $A^1$ represents a substituted monovalent heterocyclic group represented by the following formula (21) or (22); and $B^1$ represents a phenyl group which may be substituted, a naphthyl group which may be substituted, a substituted phenyl group containing a substituent that is selected from the group consisting of a hydroxy group, a sulfo group, a carboxy group, a C1-C4 alkyl group, a C1-C4 alkoxy group, an amino group, a mono or di(C1-C4 alkyl)amino group, an acetylamino group, and a benzoylamino group containing a benzene ring which may be substituted with a chlorine atom, a C1-C4 alkyl group, a nitro group, a sulfo group, or a carboxy group, or a substituted naphthyl group containing a substituent that is selected from the group consisting of a hydroxy group, a sulfo group, a C1-C4 alkoxy group, and a phenylsulfonyloxy group containing a benzene ring which may be substituted with a methyl group, a nitro group, or a chlorine atom; M represents a hydrogen atom, an alkali metal atom, or an ammonium group,

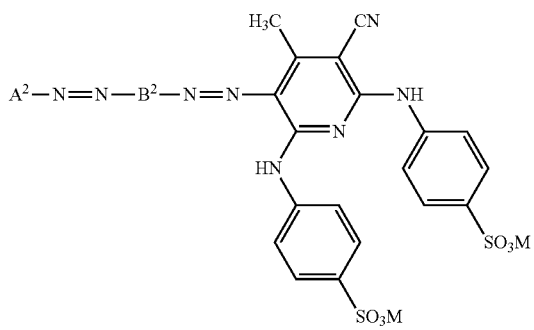

(3)

where $A^2$ represents a substituent represented by the following formula (31) or (32); $B^2$ represents a substituent represented by the following formula (33) or (34); and M represents a hydrogen atom, an alkali metal atom, or an ammonium group,

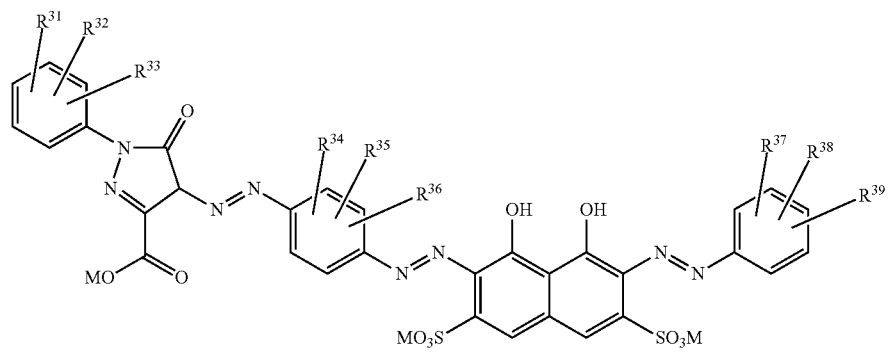

(4)

where $R^{31}$, $R^{32}$, $R^{33}$, $R^{34}$, $R^{35}$, $R^{36}$, $R^{37}$, $R^{38}$, and $R^{39}$ independently represent one selected from the group consisting of a hydrogen atom, a hydroxy group, an $SO_3M$ group, a $PO_3M_2$ group, a COOM group, a nitro group, and an amino group and M represents a hydrogen atom, an alkali metal atom, or an ammonium group, and

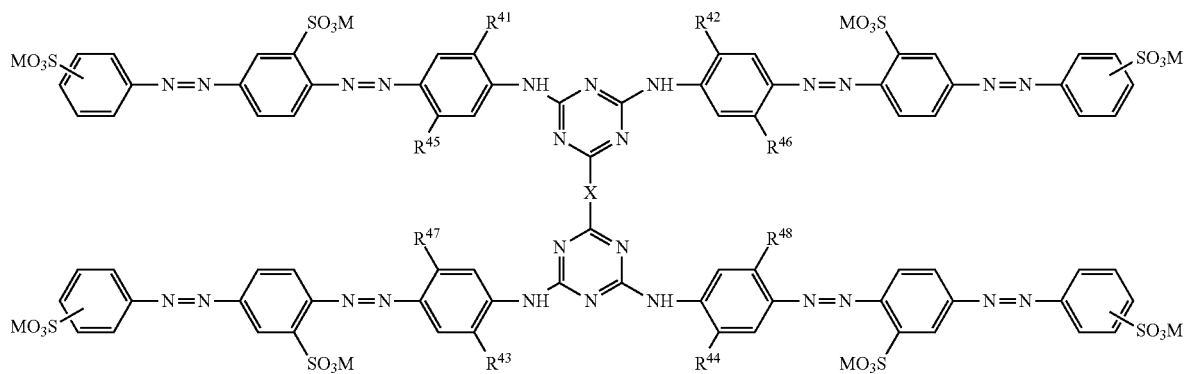

(5)

where $R^{41}$, $R^{42}$, $R^{43}$, $R^{44}$, $R^{45}$, $R^{46}$, $R^{47}$, and $R^{48}$ independently represent a hydrogen atom, a halogen atom, a C1-C4 alkyl group, a C1-C4 alkoxy group, a C1-C4 alkoxy group substituted with a sulfo group or a carboxy group, or a (C1-C4 alkyl)carbonylamino group; X represents a divalent crosslinking group; and M represents a hydrogen atom, an alkali metal atom, or an ammonium group:

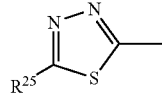
(21)

where $R^{25}$ represents a mercapto group or a (C1-C4 alkyl) thio group which may be substituted with a hydroxy group, a C1-C4 alkoxy group, a hydroxy(C1-C4 alkoxy) group, a sulfo group, or a carboxy group,

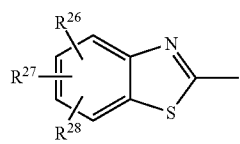
(22)

where $R^{26}$, $R^{27}$, and $R^{28}$ independently represent a hydrogen atom, a chlorine atom, a carboxy group, a sulfo group, a nitro group, a hydroxy group, a carbamoyl group, a sulfamoyl group, a C1-C4 alkyl group, a C1-C4 alkoxy group which may be substituted with a hydroxy group, a C1-C4 alkoxy group, a sulfo group, or a carboxy group, a (C1-C4 alkyl)sulfonyl group which may be substituted with a hydroxy group, a sulfo group, or a carboxy group, or a phenylsulfonyl group containing a benzene ring which may be substituted with a chlorine atom, a C1-C4 alkyl group, a nitro group, a sulfo group, or a carboxy group,

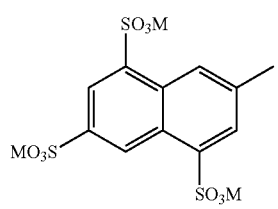
(31)

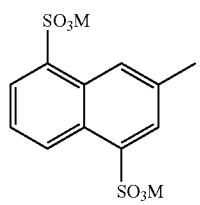
(32)

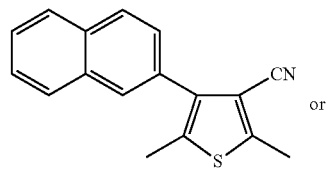
(33)

or

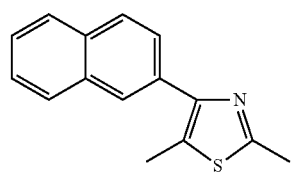
(34)

where M represents a hydrogen atom, an alkali metal atom, or an ammonium group.

7. The ink-jet ink set according to claim 1, wherein the ROD of an aqueous solution containing 5% by mass of the second yellow dye is higher than the ROD of an aqueous solution containing 5% by mass of the second cyan dye and the ROD of an aqueous solution containing 5% by mass of the second magenta dye.

8. The ink-jet ink set according to claim 1, wherein the ROD of the yellow ink is higher than the ROD of the cyan ink and the ROD of the magenta ink.

9. The ink-jet ink set according to claim 1, wherein at least one of the first cyan dye and the second cyan dye contains at least one of a compound represented by the following formula (6) and a compound represented by the following formula (7):

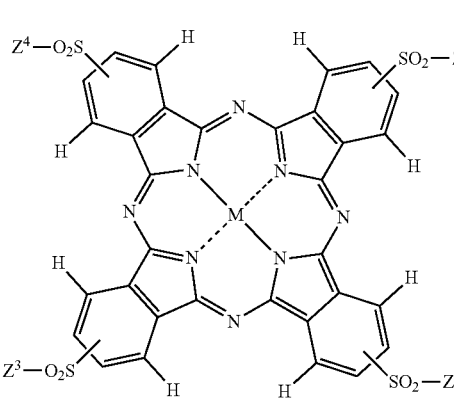
(6)

where M represents a hydrogen atom, a metal element, a metal oxide, a metal hydroxide, or a metal halide and $Z^1$ to $Z^4$ independently represent an alkyl group, a cycloalkyl group, an alkenyl group, an aralkyl group, an aryl group, or a heterocyclic group and wherein the alkyl group, the aryl group or the heterocyclic group may contain a substituent, and

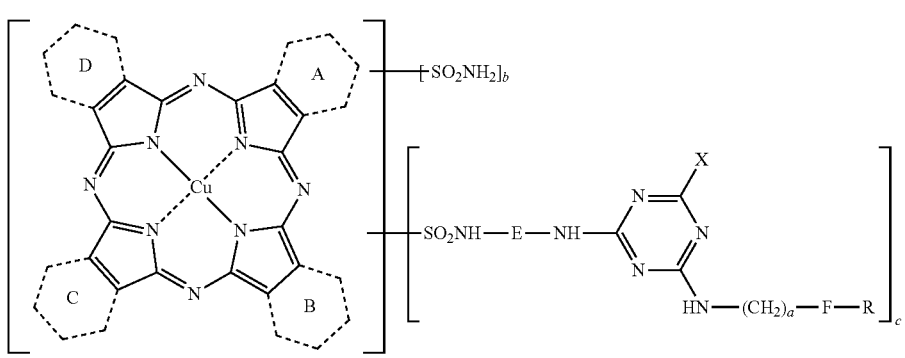

(7)

where A to D, which are each surrounded by a broken line, independently represent a benzene ring or six-membered nitrogen-containing heteroaromatic ring condensed with a porphyrazine ring, the number of the six-membered nitrogen-containing heteroaromatic rings being more than 0.00 to 3.00 on average, the remainder being benzene rings; E represents a C2-C12 alkylene group; X represents a sulfoanilino, carboxyanilino, phosphonoanilino, sulfonaphthylamino, carboxynaphthylamino, or phosphononaphthylamino group which may contain at least one substituent that is selected from the group consisting of a sulfo group, a carboxy group, a phosphono group, a sulfamoyl group, a carbamoyl group, a hydroxy group, a C1-C6 alkoxy group, an amino group, a mono(C1-C4 alkyl)amino group, a di(C1-C4 alkyl)amino group, a mono(C6-C10 aryl)amino group containing, a di(C6-C10 aryl)amino group, a (C1-C3 alkyl)carbonylamino group, a ureido group, a C1-C6 alkyl group, a nitro group, a cyano group, a halogen atom, a (C1-C6 alkyl)sulfonyl group, and a (C1-C6 alkyl)thio group; R represents a hydrogen atom, a sulfo group, a carboxy group, a phosphono group, a sulfamoyl group, a carbamoyl group, a hydroxy group, a C1-C6 alkoxy group, an amino group, a mono(C1-C6 alkyl)amino group, a di(C1-C6 alkyl)amino group, a monoarylamino group, a diarylamino group, a (C1-C3 alkyl)carbonylamino group, a ureido group, a C1-C6 alkyl group, a nitro group, a cyano group, a halogen atom, a (C1-C6 alkyl)sulfonyl group, or an alkylthio group; F represents a phenyl group or a six-membered nitrogen-containing heteroaromatic ring; a is an integer of 1 to 6; b is 0.00 to less than 3.90 on average; c is 0.10 to less than 4.00; and the sum of b and c is 1.00 to less than 4.00 on average.

10. The ink-jet ink set according to claim 1, wherein at least one of the first magenta dye and the second magenta dye contains at least one selected from the group consisting of a compound represented by following formula (8), a compound represented by following formula (9), and a compound represented by following formula (10):

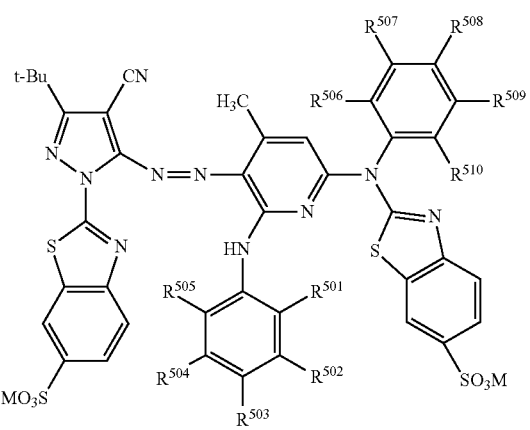

(8)

where $R^{501}$, $R^{502}$, $R^{503}$, $R^{504}$, $R^{505}$, $R^{506}$, $R^{507}$, $R^{508}$, $R^{509}$, and $R^{510}$ each represent a hydrogen atom, an alkyl group which may contain a substituent, a sulfo group, or a salt thereof and M represents a hydrogen atom, an alkali metal atom, or an ammonium group, (9)

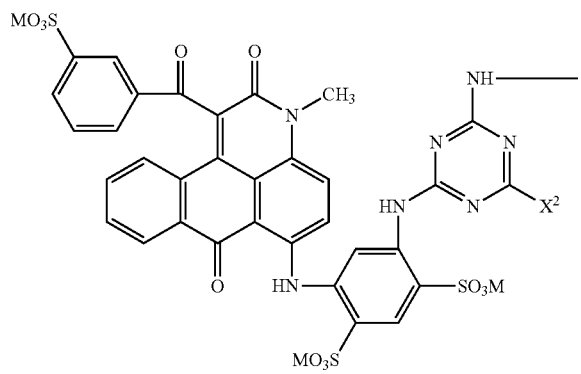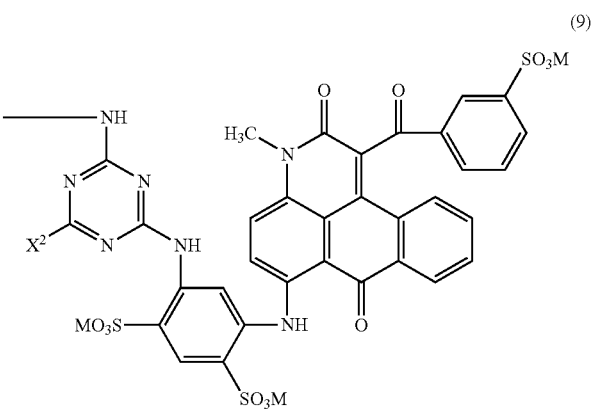

where $X^1$ represents an alkylene group, an alkylene group containing a phenylene group, or a group represented by the following formula (91); $X^2$ represents an amino group, a hydroxy group, or a chlorine atom; and M represents a hydrogen atom, an alkali metal atom, or an ammonium group, and

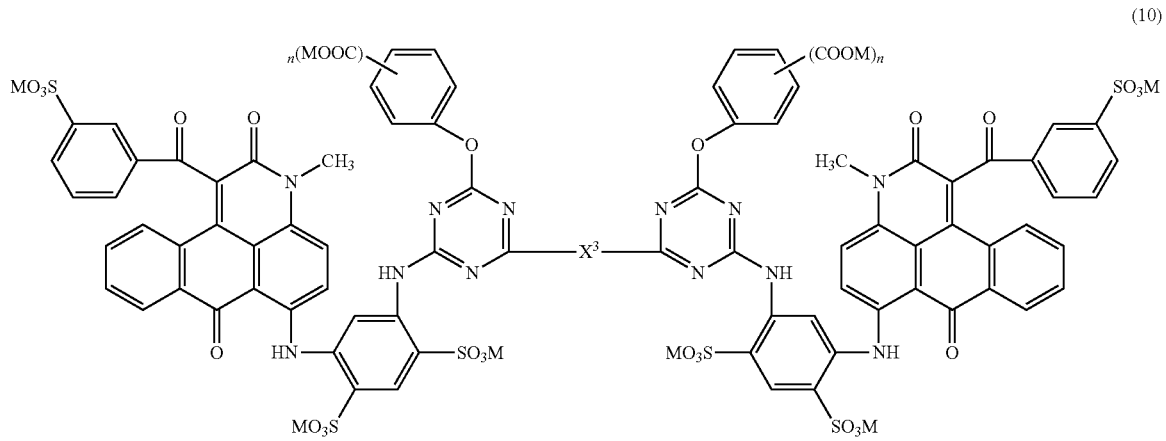

(10)

where M represents a hydrogen atom, an ammonium group, or an alkali metal atom; $X^3$ represents a diaminoalkylene group; and n is 1 or 2:

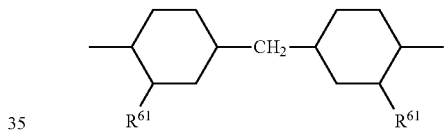

(91)

where $R^{61}$ represents a hydrogen atom or an alkyl group.

11. The ink-jet ink set according to claim 1, wherein at least one of the first yellow dye and the second yellow dye contains at least one selected from the group consisting of a compound represented by the following formula (11), a compound represented by the following formula (12), and a compound represented by the following formula (13):

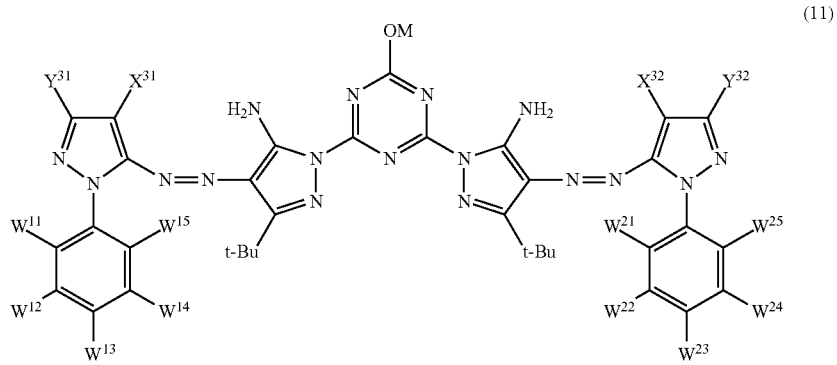

(11)

where $X^{31}$, $X^{32}$, $Y^{31}$, and $Y^{32}$ each represent a hydrogen atom or a cyano group; $W^{11}$, $W^{12}$, $W^{13}$, $W^{14}$, $W^{15}$, $W^{21}$, $W^{22}$, $W^{23}$, $W^{24}$ and $W^{25}$ each represent a hydrogen atom, a carboxy group, or a salt thereof; M represents a hydrogen atom, an ammonium group, or an alkali metal atom; and t-Bu represents a tertiary butyl group,

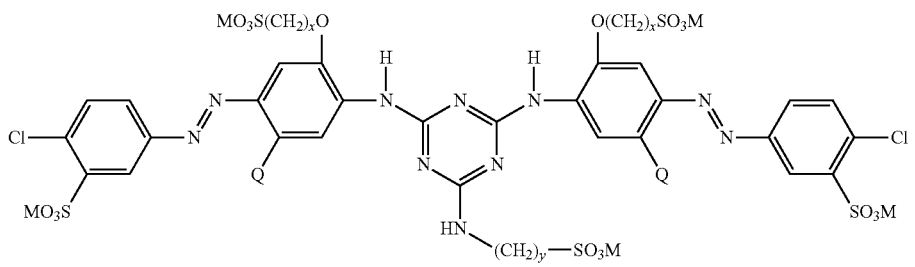
(12)
where Q represents a halogen atom; M represents a hydrogen atom, an alkali metal atom, or an ammonium group; x is an integer of 2 to 4, and y is an integer of 1 to 3, and
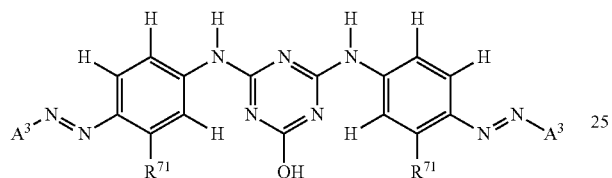
(13)
where $R^{71}$ represents a methoxy group or a methyl group and $A^3$ represents a 1,5-disulfonaphtho-3-yl group or a 1,5,7-trisulfonaphtho-2-yl group.
* * * * *